US007856485B2

(12) United States Patent
Prager et al.

(10) Patent No.: US 7,856,485 B2
(45) Date of Patent: Dec. 21, 2010

(54) SYSTEMS AND METHODS FOR PROVIDING CUSTOMIZED MEDIA CHANNELS

(75) Inventors: Justin B. Prager, Bayside, NY (US); Jeremy C. Rosenberg, Havre de Grace, MD (US); Stuart H. Farber, Horsham, PA (US)

(73) Assignee: Music Choice, Horsham, PA (US)

( * ) Notice: Subject to any disclaimer, the term of this patent is extended or adjusted under 35 U.S.C. 154(b) by 458 days.

(21) Appl. No.: 11/783,426

(22) Filed: Apr. 9, 2007

(65) Prior Publication Data

US 2007/0256021 A1    Nov. 1, 2007

Related U.S. Application Data

(63) Continuation-in-part of application No. 11/371,946, filed on Mar. 10, 2006, now Pat. No. 7,555,539, which is a continuation of application No. 09/800,956, filed on Mar. 8, 2001, now Pat. No. 7,028,082.

(60) Provisional application No. 60/187,894, filed on Mar. 8, 2000.

(51) Int. Cl.
    *G06F 15/16* (2006.01)
(52) U.S. Cl. .................... 709/219; 709/231; 725/45
(58) Field of Classification Search ................ 709/233, 709/217, 225, 219, 231; 705/1, 54; 715/765; 434/219; 725/45
    See application file for complete search history.

(56) References Cited

U.S. PATENT DOCUMENTS

| 4,127,796 A | 11/1978 | Henderson |
| RE29,997 E | 5/1979 | den Toonder ............... 325/308 |
| 4,336,478 A | 6/1982 | Quilty et al. |
| 4,338,623 A | 7/1982 | Asmus et al. |
| 4,360,805 A | 11/1982 | Andrews et al. |
| 4,677,430 A | 6/1987 | Falkman et al. |

(Continued)

FOREIGN PATENT DOCUMENTS

EP    1 022 900 A1    7/2000

(Continued)

OTHER PUBLICATIONS

Shareware Music Machine News, Shareware Music Machine.com, "MusicMatch Jukebox 6.0 gets personal", Press Release, Oct. 6, 2000, 4 pages.
Office Action issued on Sep. 28, 2007 in U.S. Appl. No.10/098,620, 19 pages.
Clark, D., "Click Radio to put a DJ in your PC," WSJ Interactive Edition, Apr. 20, 2000.

(Continued)

*Primary Examiner*—Jungwon Chang
(74) *Attorney, Agent, or Firm*—Rothwell, Figg, Ernst & Manbeck, P.C.

(57) ABSTRACT

The present application describes systems and methods for creating customized media channels. A method of the invention according to some embodiments includes: (a) transmitting to a user device information comprising a list of music genres; receiving from the user device a message indicating that a user selected one of the listed genres and including an identifier identifying the selected genre; selecting one or more media content items in response to receiving the message, wherein the selection is based, at least in part, on (i) the genre selected by the user and (ii) profile information associated with a user identifier input by the user and/or a device identifier associated with the device; and transmitting the selected media content items to the device.

32 Claims, 19 Drawing Sheets

U.S. PATENT DOCUMENTS

| | | |
|---|---|---|
| 4,722,005 A | 1/1988 | Ledenbach |
| 4,760,455 A | 7/1988 | Nagashima |
| 5,130,615 A | 7/1992 | George |
| 5,193,006 A | 3/1993 | Yamazaki |
| 5,341,350 A | 8/1994 | Frank et al. |
| 5,355,302 A | 10/1994 | Martin et al. |
| 5,365,381 A | 11/1994 | Scheffler |
| 5,371,551 A | 12/1994 | Logan et al. |
| 5,418,654 A | 5/1995 | Scheffler |
| 5,481,296 A | 1/1996 | Cragun et al. ................. 348/13 |
| 5,534,911 A | 7/1996 | Levitan .......................... 348/1 |
| 5,550,863 A | 8/1996 | Yurt et al. .................... 375/240 |
| 5,557,541 A | 9/1996 | Schulhof et al. |
| 5,572,442 A | 11/1996 | Schulhof et al. |
| 5,585,866 A | 12/1996 | Miller et al. ................. 348/731 |
| 5,590,282 A | 12/1996 | Clynes |
| 5,592,511 A | 1/1997 | Schoen et al. |
| 5,616,876 A | 4/1997 | Cluts |
| 5,617,565 A | 4/1997 | Augenbraun et al. ........ 395/604 |
| 5,629,867 A | 5/1997 | Goldman |
| 5,635,989 A | 6/1997 | Rothmuller ................. 348/563 |
| 5,636,276 A | 6/1997 | Brugger |
| 5,675,734 A | 10/1997 | Hair ....................... 395/200.01 |
| 5,708,780 A | 1/1998 | Levergood et al. ..... 395/200.12 |
| 5,721,815 A | 2/1998 | Ottesen et al. |
| 5,726,909 A | 3/1998 | Krikorian |
| 5,734,719 A | 3/1998 | Tsevdos et al. |
| 5,734,961 A | 3/1998 | Castille ....................... 455/5.1 |
| 5,751,282 A | 5/1998 | Girard et al. |
| 5,753,844 A | 5/1998 | Matsumoto |
| 5,754,939 A | 5/1998 | Herz et al. .................... 455/4.2 |
| 5,761,606 A | 6/1998 | Wolzien |
| 5,761,607 A | 6/1998 | Gudesen |
| 5,761,662 A | 6/1998 | Dasan ......................... 707/10 |
| 5,781,889 A | 7/1998 | Martin et al. |
| 5,784,595 A | 7/1998 | Devins et al. |
| 5,790,935 A | 8/1998 | Payton |
| 5,793,980 A | 8/1998 | Glaser et al. |
| 5,809,144 A | 9/1998 | Sirbu et al. |
| 5,809,246 A | 9/1998 | Goldman |
| 5,819,049 A | 10/1998 | Rietmann |
| 5,819,160 A | 10/1998 | Foladare et al. |
| 5,835,487 A | 11/1998 | Campanella |
| 5,841,979 A | 11/1998 | Schulhof et al. |
| 5,848,398 A | 12/1998 | Martin et al. |
| 5,861,906 A | 1/1999 | Dunn et al. .................... 348/7 |
| 5,878,141 A | 3/1999 | Daly et al. |
| 5,890,137 A | 3/1999 | Koreeda |
| 5,890,139 A | 3/1999 | Suzuki et al. |
| 5,899,699 A | 5/1999 | Kamiya ................. 434/307 A |
| 5,899,980 A | 5/1999 | Wilf et al. |
| 5,900,830 A | 5/1999 | Scheffler |
| 5,913,204 A | 6/1999 | Kelly |
| 5,918,213 A | 6/1999 | Bernard et al. |
| 5,926,624 A | 7/1999 | Katz et al. .............. 395/200.47 |
| 5,930,765 A | 7/1999 | Martin |
| 5,930,768 A | 7/1999 | Hooban |
| 5,931,901 A | 8/1999 | Wolfe et al. |
| 5,933,500 A | 8/1999 | Blatter et al. |
| 5,943,422 A | 8/1999 | Van Wie et al. |
| 5,944,608 A | 8/1999 | Reed et al. ..................... 463/40 |
| 5,959,945 A | 9/1999 | Kleiman |
| 5,960,411 A | 9/1999 | Hartman et al. |
| 5,961,662 A | 10/1999 | Yamaguchi et al. |
| 5,968,120 A | 10/1999 | Guedalia .................... 709/219 |
| 5,969,283 A | 10/1999 | Looney et al. |
| 5,970,474 A | 10/1999 | LeRoy et al. |
| 5,973,722 A | 10/1999 | Wakai et al. |
| 5,980,261 A | 11/1999 | Mino et al. ............. 434/307 A |
| 5,986,692 A | 11/1999 | Logan et al. .................. 348/13 |
| 5,991,374 A | 11/1999 | Hazenfield |
| 5,991,737 A | 11/1999 | Chen |
| 6,005,597 A | 12/1999 | Barrett et al. |
| 6,011,761 A | 1/2000 | Inoue ........................... 369/32 |
| 6,011,854 A | 1/2000 | Van Ryzin .................... 381/77 |
| 6,020,883 A | 2/2000 | Herz et al. |
| 6,021,432 A | 2/2000 | Sizer, II et al. ............... 709/217 |
| 6,025,868 A | 2/2000 | Russo |
| 6,038,591 A | 3/2000 | Wolfe et al. |
| 6,055,314 A | 4/2000 | Spies et al. |
| 6,055,566 A | 4/2000 | Kikinis ....................... 709/219 |
| 6,085,235 A | 7/2000 | Clarke, Jr. et al. ........... 709/219 |
| 6,088,455 A | 7/2000 | Logan et al. |
| 6,088,722 A | 7/2000 | Herz et al. ................... 709/217 |
| 6,105,060 A | 8/2000 | Rothblatt ..................... 709/219 |
| 6,135,646 A | 10/2000 | Kahn et al. ............. 395/200.47 |
| 6,151,634 A | 11/2000 | Glaser et al. |
| 6,154,772 A | 11/2000 | Dunn et al. .................. 709/217 |
| 6,161,142 A | 12/2000 | Wolfe et al. ................. 709/230 |
| 6,192,340 B1 | 2/2001 | Abecassis |
| 6,223,292 B1 | 4/2001 | Dean et al. ................... 713/202 |
| 6,226,030 B1 | 5/2001 | Harvey et al. .................. 348/7 |
| 6,226,618 B1 * | 5/2001 | Downs et al. .................. 705/1 |
| 6,229,895 B1 | 5/2001 | Son et al. |
| 6,232,539 B1 | 5/2001 | Looney et al. ................. 84/609 |
| 6,233,682 B1 | 5/2001 | Fritsch |
| 6,240,553 B1 | 5/2001 | Son et al. |
| 6,243,725 B1 | 6/2001 | Hempleman et al. ........ 707/530 |
| 6,246,672 B1 | 6/2001 | Lumelsky ................... 370/310 |
| 6,248,946 B1 | 6/2001 | Dwek .......................... 84/609 |
| 6,249,810 B1 | 6/2001 | Kiraly |
| 6,253,235 B1 | 6/2001 | Estes |
| 6,253,237 B1 | 6/2001 | Story et al. .................. 709/217 |
| 6,253,246 B1 * | 6/2001 | Nakatsuyama .............. 709/233 |
| 6,262,772 B1 | 7/2001 | Shen et al. |
| 6,279,040 B1 | 8/2001 | Ma et al. |
| 6,286,139 B1 | 9/2001 | Decinque |
| 6,287,124 B1 * | 9/2001 | Yamaura et al. ............. 434/219 |
| 6,305,020 B1 | 10/2001 | Horaty et al. |
| 6,324,217 B1 | 11/2001 | Gordon |
| 6,330,595 B1 | 12/2001 | Ullman et al. |
| 6,330,609 B1 | 12/2001 | Garofalakis et al. |
| 6,338,044 B1 | 1/2002 | Cook et al. .................... 705/14 |
| 6,351,442 B1 | 2/2002 | Tagawa et al. |
| 6,356,971 B1 | 3/2002 | Katz et al. |
| 6,369,851 B1 | 4/2002 | Marflak et al. |
| 6,389,467 B1 | 5/2002 | Eyal ........................... 709/223 |
| 6,418,421 B1 * | 7/2002 | Hurtado et al. ................ 705/54 |
| 6,434,621 B1 | 8/2002 | Pezzillo et al. |
| 6,434,747 B1 | 8/2002 | Khoo et al. ................... 725/46 |
| 6,446,130 B1 | 9/2002 | Grapes ....................... 709/231 |
| 6,490,728 B1 | 12/2002 | Kitazato et al. |
| 6,505,240 B1 | 1/2003 | Blumenau |
| 6,526,411 B1 | 2/2003 | Ward .......................... 707/102 |
| 6,529,946 B2 * | 3/2003 | Yokono et al. .............. 709/217 |
| 6,530,082 B1 | 3/2003 | Del Sesto et al. |
| 6,550,011 B1 | 4/2003 | Sims, III |
| 6,587,127 B1 * | 7/2003 | Leeke et al. ................. 715/765 |
| 6,587,837 B1 | 7/2003 | Spagna et al. |
| 6,647,417 B1 * | 11/2003 | Hunter et al. ............... 709/225 |
| 6,674,993 B1 | 1/2004 | Tarbouriech |
| 6,701,355 B1 | 3/2004 | Brandt et al. |
| 6,748,427 B2 | 6/2004 | Drosset et al. |
| 6,766,357 B1 | 7/2004 | Fandozzi |
| 6,823,225 B1 | 11/2004 | Sass |
| 6,842,604 B1 | 1/2005 | Cook et al. |
| 6,865,550 B1 | 3/2005 | Cok |
| 6,898,800 B2 | 5/2005 | Son et al. |
| 6,933,433 B1 | 8/2005 | Porteus et al. |
| 6,959,220 B1 | 10/2005 | Wiser et al. |
| 7,010,492 B1 | 3/2006 | Bassett et al. |
| 7,020,888 B2 | 3/2006 | Reynolds et al. |
| 7,028,082 B1 | 4/2006 | Rosenberg et al. |
| 7,054,547 B1 | 5/2006 | Abecassis |

| | | | |
|---|---|---|---|
| 7,065,287 | B1 | 6/2006 | Heredia et al. |
| 7,076,561 | B1 | 7/2006 | Rosenberg et al. |
| 7,133,924 | B1 | 11/2006 | Rosenberg et al. |
| 7,149,471 | B1 | 12/2006 | Arisawa et al. |
| 7,181,297 | B1 | 2/2007 | Pluvinage et al. |
| 7,185,355 | B1 | 2/2007 | Ellis et al. |
| 7,209,892 | B1 | 4/2007 | Galuten et al. |
| 7,321,923 | B1 | 1/2008 | Rosenberg et al. |
| 7,325,043 | B1 | 1/2008 | Rosenberg et al. |
| 7,555,539 | B1 | 6/2009 | Rosenberg et al. |
| 2001/0032312 | A1 | 10/2001 | Runje et al. |
| 2001/0042107 | A1 | 11/2001 | Palm |
| 2001/0049826 | A1 | 12/2001 | Wilf |
| 2002/0021708 | A1 | 2/2002 | Ishiai |
| 2002/0023164 | A1 | 2/2002 | Lahr |
| 2002/0023166 | A1 | 2/2002 | Bar-Noy et al. |
| 2002/0032728 | A1 | 3/2002 | Sako et al. |
| 2002/0038359 | A1 | 3/2002 | Ihara et al. |
| 2002/0046084 | A1 | 4/2002 | Steele et al. |
| 2002/0056117 | A1 | 5/2002 | Hasegawa et al. |
| 2002/0056118 | A1 | 5/2002 | Hunter et al. |
| 2002/0059363 | A1 | 5/2002 | Katz et al. |
| 2002/0059621 | A1 | 5/2002 | Thomas et al. |
| 2002/0062261 | A1 | 5/2002 | Mukai |
| 2002/0083148 | A1 | 6/2002 | Shaw et al. |
| 2002/0138630 | A1 | 9/2002 | Solomon et al. |
| 2002/0152278 | A1 | 10/2002 | Pontenzone et al. |
| 2002/0194260 | A1 | 12/2002 | Headley et al. |
| 2002/0194619 | A1 | 12/2002 | Chang et al. |
| 2003/0023975 | A1 | 1/2003 | Schrader et al. |
| 2003/0050058 | A1 | 3/2003 | Walsh et al. |
| 2003/0097338 | A1 | 5/2003 | Mankovich et al. |
| 2003/0135464 | A1 | 7/2003 | Mourad et al. |
| 2003/0182184 | A1 | 9/2003 | Strasnick et al. |
| 2006/0173974 | A1 | 8/2006 | Tang |

FOREIGN PATENT DOCUMENTS

| | | |
|---|---|---|
| WO | WO 97/37492 A1 | 10/1997 |
| WO | WO 99/17230 A1 | 4/1999 |
| WO | WO 99/48296 A1 | 9/1999 |
| WO | WO 00/07368 A1 | 2/2000 |
| WO | WO 01/35874 A1 | 5/2001 |
| WO | WO 01/36064 A1 | 5/2001 |

OTHER PUBLICATIONS

Press Release, "Philips Showcases ClickRadio On Digital Set-Top At Western Show 2000," Nov. 20, 2000.
Gordon, C., "Click Radio Sidesteps Competition with Music Licensing Deals," atnewyork.com, May 9, 2000.
Office Action issued on Apr. 4, 2008 in U.S. Appl. No. 10/098,620, 24 pages.
Office Action issued on Mar. 16, 2005 in U.S. Appl. No. 09/800,956, 20 pp.
Office Action issued on May 24, 2005 in U.S. Appl. No. 10/098,482, 10 pp.
Office Action issued on Feb. 15, 2006 in U.S. Appl. No. 10/098,482, 12 pp.
Office Action issued on Apr. 18, 2006 in U.S. Appl. No. 10/098,482, 3 pp.
Office Action issued on Nov. 21, 2006 in U.S. Appl. No. 10/098,482, 11 pp.
Office Action issued on Aug. 30, 2005 in U.S. Appl. No. 10/098,473, 8 pp.
Office Action issued on Aug. 30, 2005 in U.S. Appl. No. 10/098,450, 8 pp.
Office Action issued on Mar. 13, 2007 in U.S. Appl. No. 10/339,425, 13 pp.
Office Action issued on Aug. 29, 2006 in U.S. Appl. No. 10/339,425, 19 pp.
Office Action issued on Dec. 6, 2006 in U.S. Appl. No. 11/002,181, 10 pp.
Office Action issued on Jun. 8, 2007 in U.S. Appl. No. 11/002,181, 13 pp.
Office Action issued on Aug. 23, 2005 in U.S. Appl. No. 10/098,620, 15 pp.
Office Action issued on Jun. 15, 2006 in U.S. Appl. No. 10/098,620, 14 pp.
Office Action issued on Apr. 4, 2007 in U.S. Appl. No. 10/098,620, 12 pp.
Loeb, S., "Architecting Personalized Delivery of Multimedia Information", Information Filtering, Communications of the ACM, Dec. 1992, vol. 35, No. 12, pp. 39-48.
Bower, "Digital Radio—A Revolution for In-Car Entertainment," Proc. NavPos Automative '98 Conf. vol. 2, Session 5-8, 10 pages, Jun. 10, 1998.
Radio Authority, Digital Radio Fact Sheet No. 4, 1999. http://www.radioauthority.org.uk/Information/Fact_Sheets/fs4.htm, 5 pages.
"The ICTV, Digital Broadband System," ICTV, Inc. White Paper, 2000, 11 pages.
"Sonicbox brings Net radio into your living room," (Partyka, Jeff. Oct. 12, 1999. CNN.com), 3 pages.
"Internet Radio Listeners Unchained From Their PCs," (Olenick, Doug. Oct. 25, 1999. Twice Computer Technology), 1 page.
"Sonicbox and Microsoft Bring Windows Media Internet Radio to the Home Stereo," (Dec. 7, 1999 Microsoft Press Release), 3 pages.
King, B. "Tune on, Tune in, Drop Cash" Dec. 8, 2000, Wired News, 2 pages.
"Global Media Announces Launch of Independent Internet Radio station,"; News Release, Feb. 1, 1999, 2 pages.
"Platinum Entertainment and Liquid Audio Join Forces to Offer Extensive Music Catalog via Digital Downloads", Press Release, Jul. 15, 1998, 2 pages.
LaFrance, "Thinking Globally with a web-based radio station vying for listeners around the world, homegrown internet company fastband aims to shake up the music world", Times Picayune, Nov. 4, 1999, 2 pages.
"Tune into Yahoo! Radio," Yahoo Media Relations Press Release, Yahoo! teams up with Broadcast.com and Spinner.com to Provide 10 stations of Audio Programming, May 11, 1999, 2 pages.
"Yahoo Offers one-stop shop for e-music," Milwaulkee Journal Sentinel (Wisconsin), Aug. 25, 1999, 1 page.
"uniView Technologies Now in Yahoo!'s Multicast Affiliate Program," Press Release Newswire Association, Inc., Oct. 19, 1999, 2 pages.
"WebRadio.com Signs on as Liquid Music Network Affiliate Offering Liquid Audio Digital Downloads," Business Wire, Inc., Sep. 1, 1999, 2 pages.
"Blue Note Radio," Now Playing on a Computer Screen Near You. EMI's Blue Note Records Expands New Media Initiative with RadioWave.com, Press Release Newswire Association, Inc., Apr. 4, 2000, 2 pages.
"Set-top box for television that reads your mind," Financial Times Limited, Dec. 30, 1998, 1 page.
Rajapakshe, H. et al., "Video On Demand," Jun. 1995, pp. 1-15.
Welz, G., "Integrated Streaming Technologies," Oct. 30, 1996, pp. 1-3.
"ClickRadio Granted First Interactive Radio License by Universal Music Group", 3 pages from the web site at www.clickradio.com, printed Apr. 26, 2000.
Office Action issued in U.S. Appl. No. 12/003,784, filed Jan. 27, 2010, 9 pages.
Office Action issued on Aug. 19, 2009 in U.S. Appl. No. 11/928,904, 9 pages.
Office Action issued on Dec. 31, 2009 in U.S. Appl. No. 11/928,932, 12 pages.
Office Action issued on Nov. 13, 2009 in U.S. Appl. No. 10/098,620, 21 pages.
Office Action issued in U.S. Appl. No. 11/928,904, filed Feb. 9, 2010, 14 pages.
Decision in *Arista Records, LLC et al.* v. *Launch Media, Inc.*, Case No. 07-2576-cv, United States Court of Appeals for the Second Circuit, decided Aug. 21, 2009, 42 pages.

\* cited by examiner

LIBRARY CATALOGUE 217

| SOUND RECORDING ID | LOCATION | OWNED BY USER? | GENRE(S) | STYLE(S) |
|---|---|---|---|---|
| SONG-TITLE 1 | C:/LIBRARY | YES | GENRE (1) GENRE (2) | STYLE 1 STYLE 2 STYLE 3 |
| SONG-TITLE 2 | C:/LIBRARY | NO | GENRE (5) | STYLE 7 |
| ... | ... | ... | | |

FIG.3

| SOUND RECORDING ID | GENRE(S) | STYLE(S) | OWNED BY USER? | META-DATA |
|---|---|---|---|---|
| | PLAY-LIST FOR AUDIO CHANNEL: JAZZ/BLUES | | | |
| SONG-TITLE 1 | JAZZ | STYLE 2 STYLE 5 STYLE 8 | NO | ARTIST NAME, ALBUM, DATE ... |
| SONG-TITLE 2 | BLUES ROCK | STYLE 1 STYLE 2 | YES | |
| ... | | | | |
| SONG-TITLE N | JAZZ | STYLE 1 | NO | |

CREATE/MODIFY A PROFILE

CHANNEL NAME: [MY-CHANNEL] —1002

GENRES: (SELECT ONE OR MORE GENRES)
- ☐ ROCK  ☐ ALTERNATIVE  ☐ COUNTRY
- ☒ BLUES  ☒ JAZZ  ☐ TOP 40
- ☐ EASY LISTENING  ☐ 80's MUSIC

—1004

[GENRE EQ] —1005

FAVORITE ARTISTS: [U2, REM, RADIOHEAD] —1006

LEAST FAVORITE ARTISTS: [ ] —1007

FAVORITE SONGS: [ ] —1008

LEAST FAVORITE SONGS: [ ] —1009

NEWS CATEGORIES: [SPORTS, WEATHER, TRAFFIC] —1010

[DONE] —1090

NEWS KEYWORD: [ ] —1011

SYSTEMS AND METHODS FOR PROVIDING CUSTOMIZED MEDIA CHANNELS

This application is a continuation-in-part of U.S. patent application Ser. No. 11/371,946, filed on Mar. 10, 2006 now U.S. Pat. No. 7,555,539, which is a continuation of U.S. patent application Ser. No. 09/800,956, filed on Mar. 8, 2001 (now U.S. Pat. No. 7,028,082), which claims the benefit of U.S. Provisional Patent Application No. 60/187,894, filed on Mar. 8, 2000 (status abandoned). U.S. Pat. No. 7,028,082 is incorporated herein by this reference and U.S. patent application Ser. Nos. 11/371,946 and 60/187,894 are incorporated herein by this reference.

BACKGROUND OF THE INVENTION

1. Field of the Invention

The present invention is related to systems and methods for providing customized media channels.

2. Discussion of the Background

Users who frequently use conventional media systems (e.g., users that listen to conventional radio stations or watch conventional music video stations) know all too well that the conventional media systems do not always provide (e.g., play) the media content (e.g. songs or music videos) that the listener wants to consume (e.g., hear or, in the case of music videos, watch). This is due to the simple fact that conventional media systems must accommodate the tastes of a mass audience.

What is desired, therefore, is a system to overcome these and other disadvantages of conventional media systems.

SUMMARY OF THE INVENTION

An aspect of the present invention provides media systems and methods that overcome many of the above described disadvantages associated with conventional media systems and methods According to one embodiment, a method for providing a customized media channel includes: (a), displaying to the user a graphical user interface that comprises a list of music genres using the client's display; (b) enabling the user to select one of the listed music genres; (c) in response to the user selecting one of the listed music genres, transmitting a message from the client to a server, wherein the message includes a genre identifier identifying the selected genre; (d) in response to receiving the message, selecting a media content item based, at least in part, on the genre selected by the user; (e) immediately after step (d), transmitting the selected media content item to the client using a one-to-one connection; and (f) receiving the media content item at the client and playing the media content item for the user.

In some embodiments the media content item is selected based, at least in part, not only on the selected genre but also profile information associated with a user identifier input by the user and/or a client identifier associated with the client. The profile information may include or consist of only a set of identifiers identifying media content items previously played for the user and/or previously transmitted to the device. The method my also include the step of adding to the set of identifiers an identifier that identifies the selected media content item and occasionally removing one or more identifies from the set of identifiers. In some embodiments, the set of identifiers has a predefined maximum size. Additionally, in some embodiments, the method may also include enabling a user to indicate that the user likes or does not like the media content item while the media content item is being played and updating the profile information as a result of the user indicating that he or she likes or does not like the media content item. In some embodiments, the step of selecting a media content item comprises retrieving a media content item identifier from a playlist.

According to one embodiment, a system for providing a customized media channel includes: a server system; and a network enabling a user client to communicate with the server system, wherein the server system is operable to: (a) transmit to the user client information comprising a list of music genres; (b) receive from the user client a message indicating that the user selected one of the listed genres and including an identifier identifying the selected genre; (c) select one or more media content items in response to receiving the message, wherein the selection of the one or more media content items is based, at least in part, the genre selected by the user; and (d) transmit the selected media items to, and only to, the user client.

In some embodiments the media content item is selected based, at least in part, not only on the selected genre but also profile information associated with a user identifier input by the user and/or a client identifier associated with the client. The profile information may comprise or consists of a set of identifiers identifying media content items previously played for the user and/or previously transmitted to the device and the sever system is further operable to add to the set of identifiers an identifier that identifies one of the selected media content items.

In some embodiments, the user device is operable to enable a user to indicate that the user likes or does not like a media content item while the media content item is being played by the user device and the server system is further operable to update the profile information as a result of receiving from the user device a communication indicating that the user likes or does not like the media content item. In some embodiments, the user device is a set-top box and a television monitor is connected to the set-top box.

Further features and advantages of various embodiments of the present invention, as well as the structure and operation of these embodiments, are described below with reference to the accompanying drawings.

BRIEF DESCRIPTION OF THE DRAWINGS

The accompanying drawings, which are incorporated herein and form part of the specification, illustrate various embodiments of the present invention. In the drawings, like reference numbers indicate identical or functionally similar elements.

FIG. 3 is an illustration of the library catalogue, according to one embodiment.

FIG. 10 is an illustration of a GUI page for enabling user 110 to personalize a media channel, according to one embodiment.

DETAILED DESCRIPTION OF THE PREFERRED EMBODIMENTS

Figure 1:
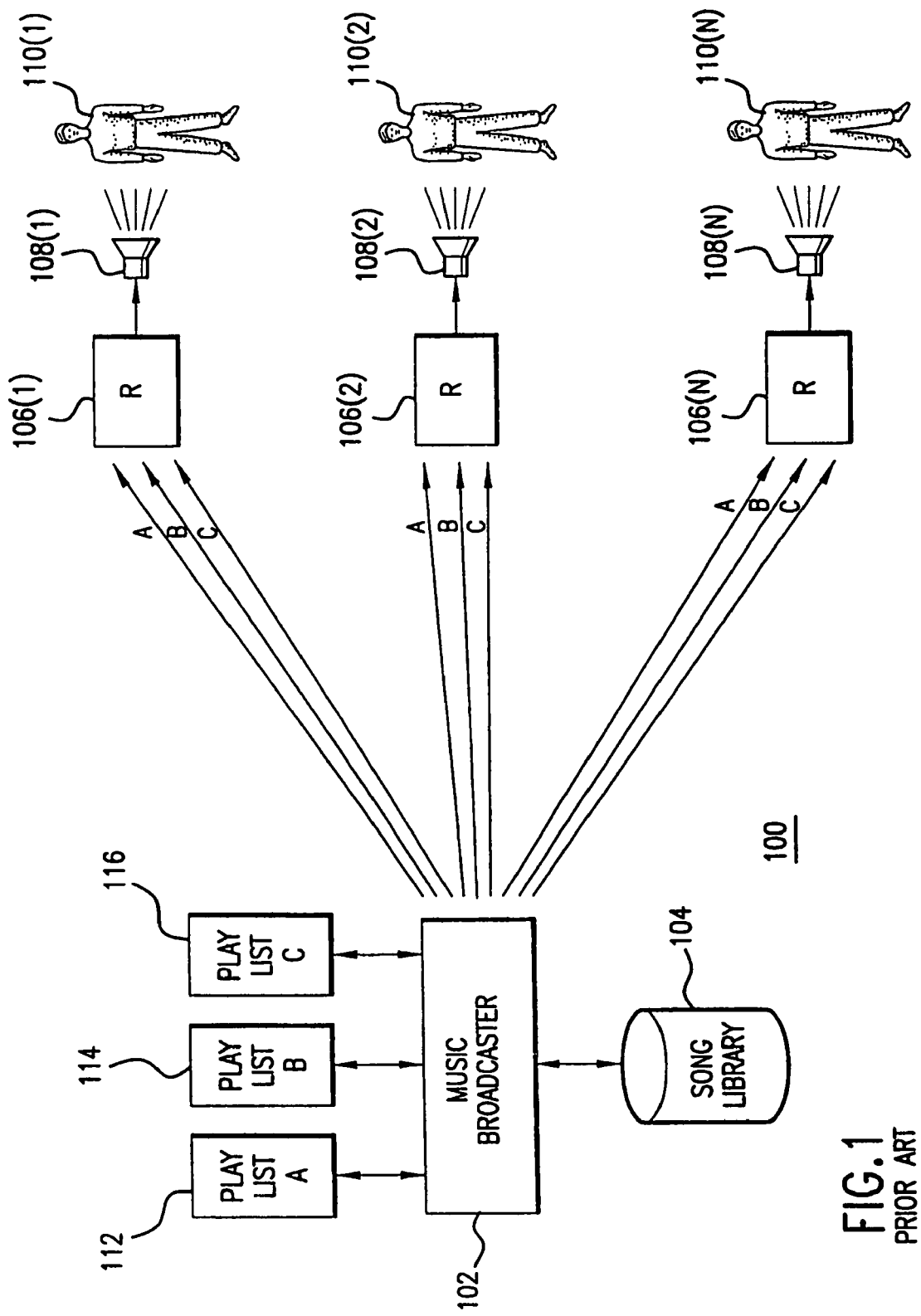
FIG. 1 is a diagram of a conventional media system.

FIG. 1 is a diagram of a conventional media system 100. As shown in FIG. 1, there is illustrated a music broadcaster 102 broadcasting sound recordings (e.g., songs) over three stations (stations A, B, and C) to users 110(1) 110(N). For the sake of simplicity, we can assume station A is devoted to Alternative music, station B is dedicated to Jazz, and station C is devoted to Classical music. Also for the sake of simplicity, FIG. 1 only shows a single music broadcaster. However, it is well understood that there could exist a number of music broadcasters like broadcaster 102, and that music broadcaster 102 may broadcast music over fewer or more stations than that shown. Additionally, broadcaster 102 may employ many networks and/or systems to broadcast music to users 110. Such networks/systems include: satellite networks, cable television networks, the Internet, conventional radio towers, and other like networks and systems.

Music broadcaster 102 may have a master sound recording library 104 that contains a collection of sound recordings that are available to be broadcast to the listeners 110. Additionally, music broadcaster 102 may have three playlists 112, 114, and 116. Each playlist is associated with one of the stations A, B, and C. As its name implies, a playlist contains an ordered list of media content identifiers (e.g., song titles) that identify the sound recordings that are to be broadcast to listeners 110. Music broadcaster 102 may use the playlists to determine which sound recordings to select from sound recording library 104 for broadcast to listeners 110. For example, the music broadcaster 102 may broadcast the sound recordings listed in the playlist in the order in which they are listed. The playlists may contain a day's worth of sound recordings, in which case, every day a new playlist is generated so that the music broadcaster 102 does not broadcast the same sound recordings in the same order two days in a row.

Users 110 each have at least a receiver 106 for receiving one of the stations of music and sound reproducing equipment 108 for reproducing the received music. Because each station of music is necessarily broadcast to each user 110, music broadcaster 102 must select sound recordings to broadcast that will be favorable to a wide audience. In other words, play-lists 112, 114, and 116 each contain a list of sound recordings that are expected to be enjoyed by a mass audience, rather than any particular user 110.

Because of bandwidth limitation problems, it may be too costly for music broadcaster 102 to create a customized audio station for each user 110. Thus, there may be times when broadcaster 102 is not broadcasting any sound recordings that a user 110 prefers to receive. The system shown in FIG. 2 is designed to overcome this problem.

Customized Media System 200

Figure 2:
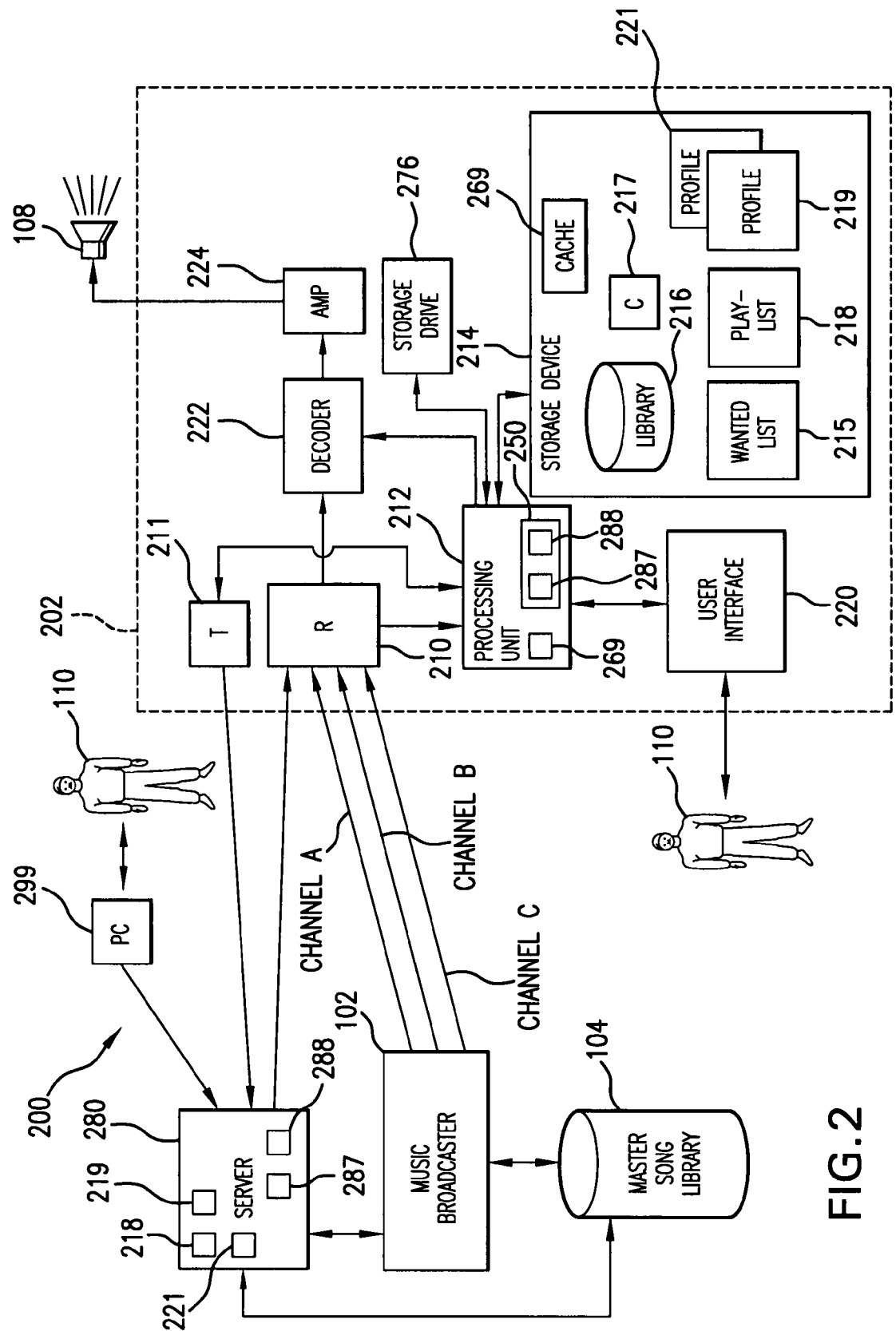
FIG. 2 is a diagram of customized media system, according to one embodiment

FIG. 2 shows a functional block diagram of a customized media system 200 (e.g., a system for providing to a user a customized stream of media content) according to one embodiment. As illustrated in FIG. 2, media system 200 includes a user device 202 and a remote server 280.

User Device 202

A block diagram of user device 202, according to one embodiment, is illustrated in FIG. 2. In the illustrated embodiment, user device 202 includes one or more receivers 210 that are operable to receive transmitted data, a transmitter 211 for transmitting signals to other devices (such as server 280), a data processing unit 212, a persistent storage device 214, a user interface 220, a decoder 222, an amplifier 224, and a removable storage drive 276 (e.g., CD ROM or DVD drive).

Receiver 210 can be any device that can receive data. For example, it can be any one or a combination of the following: a radio frequency (RF) receiver for receiving data broadcast by radio waves, a cable-tv receiver for receiving signals transmitted through an analog or digital cable-tv system, a satellite receiver for receiving signals transmitted by satellite, a data network receiver for receiving data transmitted through a data network (e.g., the Internet), etc. It is also contemplated that receiver 210 can function to transmit data as well as receive data, in which case separate transmitter 211 may not be needed, in which case device 210 is a transceiver.

Data processing unit 212 is adapted to control the operation of user device 202 through software 250. Data processing unit 212 may include one or more programmable processors and memory (e.g., RAM and ROM) for storing data and software 250. Based on the detailed description of the functionality of user device 202 given below, one of ordinary skill in the art is able create software 250.

User interface 220 allows user 110 to interact with user device 202. User interface 220 may include input devices (e.g., keyboard, mouse, infrared remote control, etc.) for user 110 to input commands to processing unit 212. Additionally, in one embodiment, user interface 220 may include a display screen for displaying a graphical user interface (GUI), that enables user 110 to input commands and make selections. The display screen may be a standard television monitor, a standard computer monitor, or any other display device that is capable of displaying a user interface.

Storage device 214, in one embodiment, stores one or more sound recordings (referred to as local sound recording library 216). Preferably, to prevent theft and/or copyright violations and for other security reasons, each sound recording not owned by user 110 is encrypted and/or watermarked before the sound recording is placed in the library 216. User 110 may be considered to own a sound recording in the cases where the user has either purchased the sound recording or otherwise has unrestricted possession of the sound recording.

Storage device 214, in one embodiment, also stores a library catalogue 217. Catalogue 217 maintains a list of each sound recording that is in local sound recording library 216. FIG. 3 illustrates one embodiment of library catalogue 217. In this embodiment, for each sound recording in library 216, catalogue 217 keeps track of the genre(s) and style(s) to which the sound recording belongs and also keeps track of whether or not user 110 owns the sound recording.

In one embodiment, user device 202 is a cable-tv set-top box or implemented within a cable-tv set-top box, server 280 is a "head-end sever" (i.e., located at a cable system head-end), and device 202 communicates with server 280 through a cable-tv transmission system. Server 280 may have a hardware component and a software component. The hardware component may include conventional sever hardware components (e.g., processor, memory, etc.) and one of ordinary skill in the art will be able to create the software component from the description herein of server 280's functionality.

Features and Operation of User Device 202

As appreciated by one or ordinary skill in the art, the features and operations described below are illustrative and not mean to limit the invention.

Software 250 enables user 110 to perform a number of operations. For example, in some embodiments, software 250 enables user 110 to select to listen to a particular media channel (a.k.a., media station), modify or delete an existing media channel, and create one or more media channels. In one embodiment, user 110 can also use a separate computer 299 to modify and delete existing media channels and to create new media channels, provided that computer 299 is able to communicate with remote server 280 or device 202.

Figure 4:
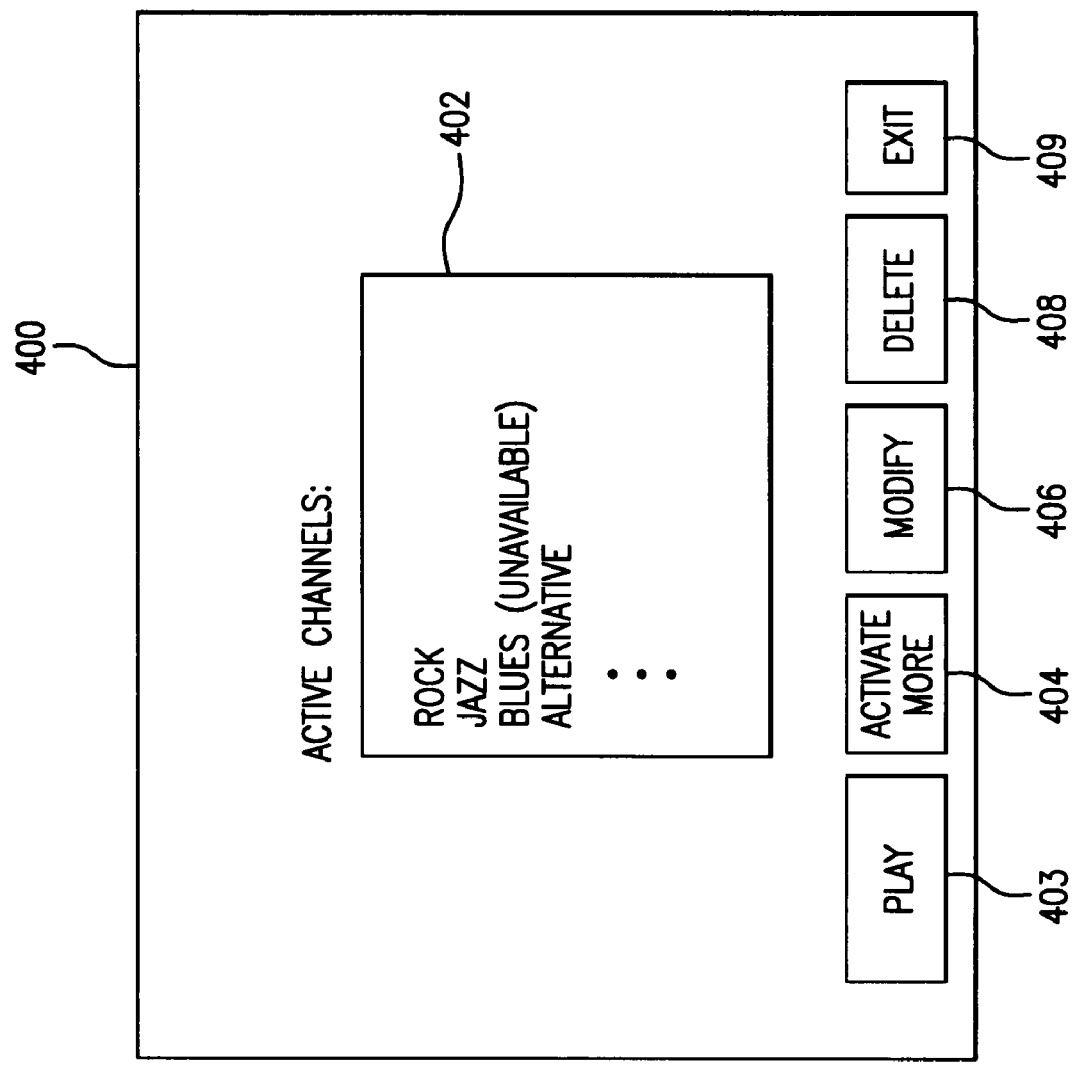
FIG. 4 is an illustration of a GUI page for enabling user 110 to select a media channel to play, according to one embodiment.

FIG. 4 illustrates a user interface page 400, according to one embodiment, from which user 110 can (1) select to play (e.g., watch and/or listen to) an active media channel, (2) activate additional media channels, (3) modify an active media channel, and (4) delete an active media channel.

Page 400 includes a text window 402 for listing the active media channels. Page 400 also includes a play-button 403, an activate-button 404, a modify-button 406, a delete-button 408, and an exit-button 409. In one embodiment, the first time user 110 uses device 202, there are no active media channels, so the first step is for user 110 is to activate one or more media channels. User 110 performs this function by first selecting activate-button 404.

In response to user 110 activating button 404, a page 500 (see FIG. 5) is displayed to the user using user interface 220. Page 500 is referred to as the "activate media channels page." From the activate media channels page 500, user 110 can activate one or more media channels and create a media channel. The process of creating a media channel is described further below with reference to FIG. 10.

Figure 5:
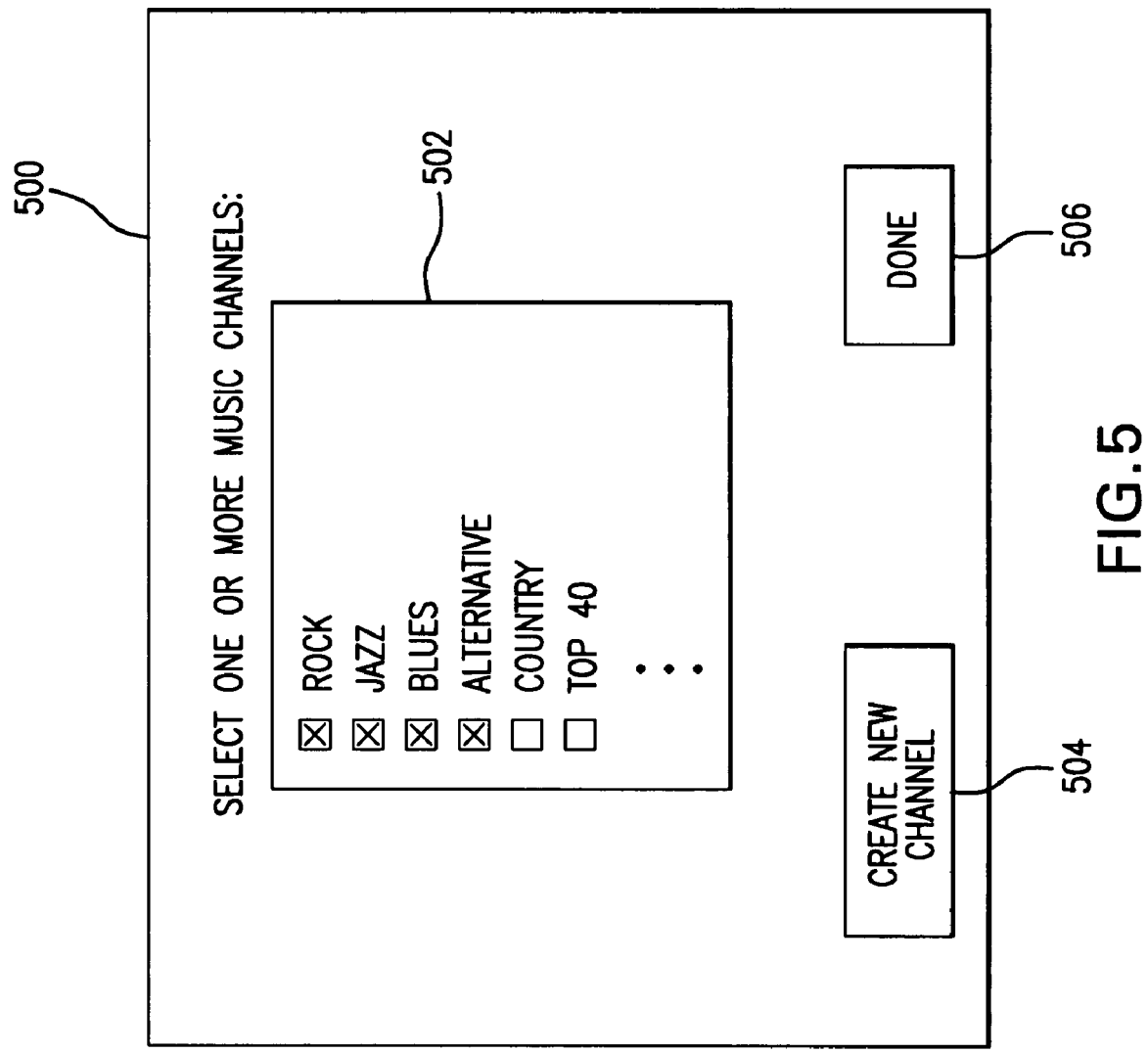
FIG. 5 is an illustration of a GUI page for enabling user 110 to activate predefined media channels and to create new media channels, according to one embodiment.

Referring now to FIG. 5, a text box 502 lists all of the media channels that are available to be activated. These channels may include predefined and user-created media channels. A service provider may predefine a number of media channels. The predefined media channels may be identified according to the genre and/or style of music and/or information associated with the channel. For example, as shown in page 500, the following six channels were predefined: (1) Rock, (2) Jazz, (3) Blues, (4) Alternative, (5) Country, and (6) Top-40. The predefined media channels may be customized by and/or for the user 110 as described herein.

In some embodiments, each predefined media channel is logically linked with one or more "channel profiles" 219 (as used herein a "channel profile 219" means a set of information related to a user or users), and each said channel profile 219 is logically linked to a different user 110 and/or different device 202. Also, in some embodiments, a user-created media channel is logically linked with a channel profile 219 that is linked with a user 110 or device 202. A channel profile 219 linked with a user 110 and/or device 202 may be stored in device 202. Additionally (or alternatively) the channel profile 219 may be stored in a storage unit directly accessibly by server 280. Additionally, in some embodiments, each user 110 or device 202 is logically linked with a user profile 221.

A channel profile 219 may contain, among other things, information that is used in selecting media content that is reproduced in response to a user 110 selecting to play a media channel. For example, a channel profile 219 may include information identifying a user's media content preferences (i.e., specific likes and dislikes) and/or information identifying media content to which the user has recently been exposed. Similarly, a user profile 221 linked with a particular user 110 may contain, among other things, information that is used in selecting the media content that is reproduced in response to the particular user 110 selecting to play a pre-defined or user-created media channel. An example channel profile 219 is described in greater detail further below with reference to FIG. 9.

In some embodiments, each predefined media channel is linked with a specific genre and/or style. In some of these embodiments, for each predefined media channel that is set to active, a plurality of media content items (e.g., sound recordings) that match the genre/style with which the media channel is linked is placed in library 216 and the library catalogue 217 is appropriately updated and/or a playlist 218 associated with the media channel is created and stored in storage device 214. Playlists 218 is described in greater detail further below with reference to FIG. 8.

To activate one or more media channels listed in window 502, user 110 selects one or more of the media channels by placing a mark in one or more of the boxes adjacent to the media channels and then selects done-button 506. In response to user 110 activating done-button 506, device 202 determines which of the listed channels were selected and then changes the state of the selected channels from in-active to active or device 202 communicates the user's selections to server 280, which then keeps track of the user's selection by storing information identifying the selections in, for example, a database.

Referring back to FIG. 4, page 400 enables user 110 to select to play an active media channel by, for example, selecting a channel listed in window 402 and then activating a play-button 403. In some embodiments, in response to user 110 selecting a channel and activating play-button 403, device 202 selects and plays one or more media content items (e.g., sound recordings or videos) that match the channel profile 219 linked with the selected media channel and particular user 110. Additionally, the media content items selected by device 202 may be based on a user profile 221 linked with the particular user 110. Also, in some embodiments, a user interface page 600 (See FIG. 6) is displayed to user 110 in response to the user activating play-button 403.

Figure 6:
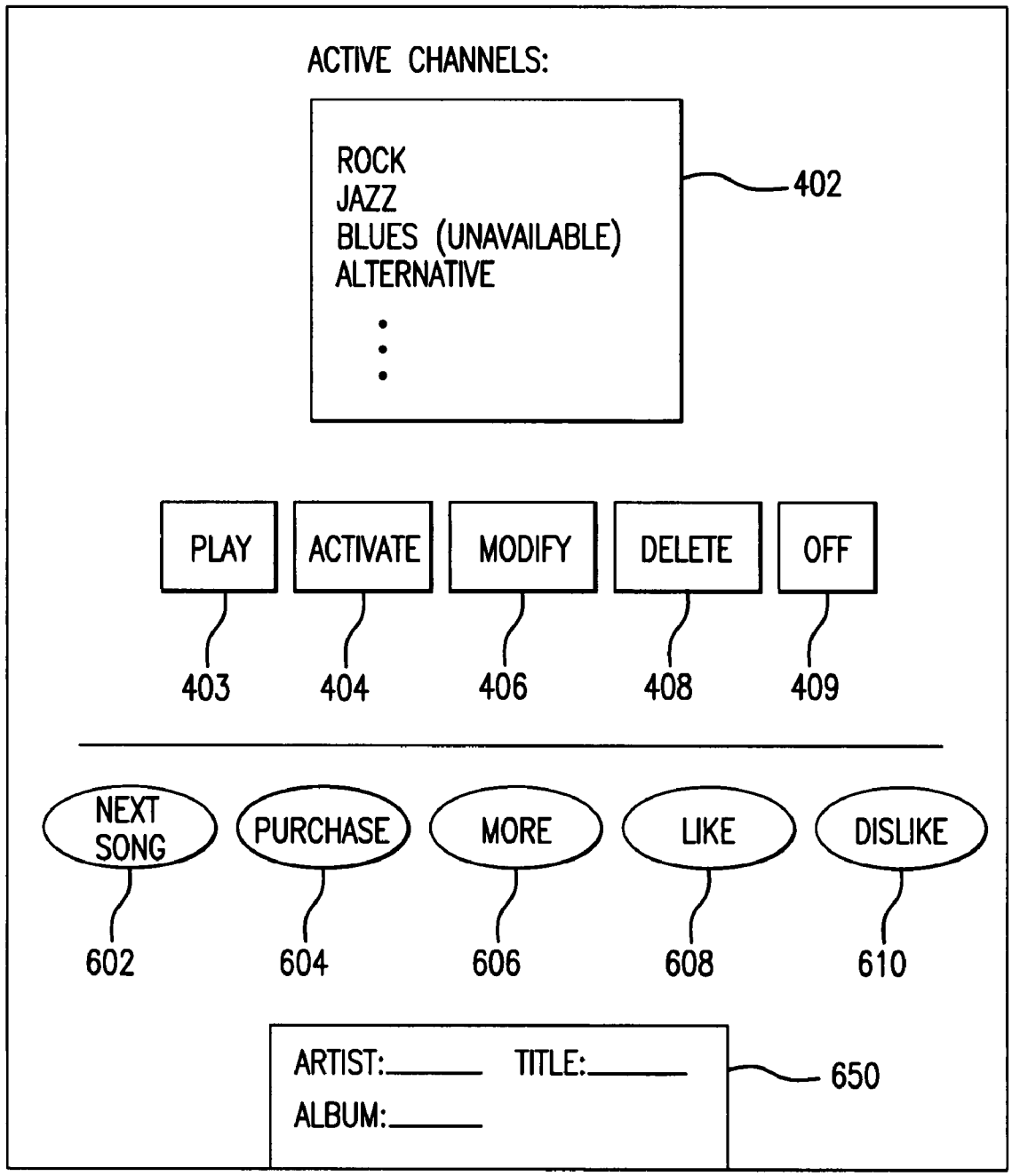
FIG. 6 is an illustration of a GUI page that is presented to user 110 after user 110 selects a media channel to play, according to one embodiment.

Referring now to FIG. 6, page 600 is like page 400 except that additional command-buttons and a meta-data display area 650 are included in page 600. The additional command-buttons include the following: a next-button 602, a purchase-button 604, a more-button 606, a like-button 608, and a dis-like-button 610.

In one embodiment, from user 110's perspective, listening to a media channel is very similar to listening to a conventional media channel. What we mean by this is that when listening to one of the predefined or user-created media channels, user 110 has no direct control over which songs get played and, in most cases, user has no way of determining the next song that is to be played.

In some embodiments, however, user 110 has indirect control over which songs get played because, in some embodiments, user 110 has direct control over a media channel's profile, which may specify, among other things, the types of sound recordings that the channel plays at least a majority of the time. Thus, user 110 can specify that a particular media channel should play Hard Rock songs and/or other songs matching other characteristics (e.g., tempo) at least a majority of the time, but user 110 can not specify that a particular set of Hard Rock songs will be played in a particular order at any desired point in time. In other words, user 110 has no direct control over a media channel's playlist or the process through which the media channel selects songs to be played. In some embodiments, there is at least an exception to the above rule. User 110 may specify that a particular set of sound recordings is played in a particular order at a particular time if, and only if, user 110 owns a copy of each sound recording in the set.

As is appreciated by those skilled in the art, user interface pages 400, 500, and 600 are not the only user interfaces that can be employed in the present invention. Thus, it is understood that page 400, 500 and 600 are used merely to illustrate an embodiment of the invention and not to limit the invention.

Figure 7:
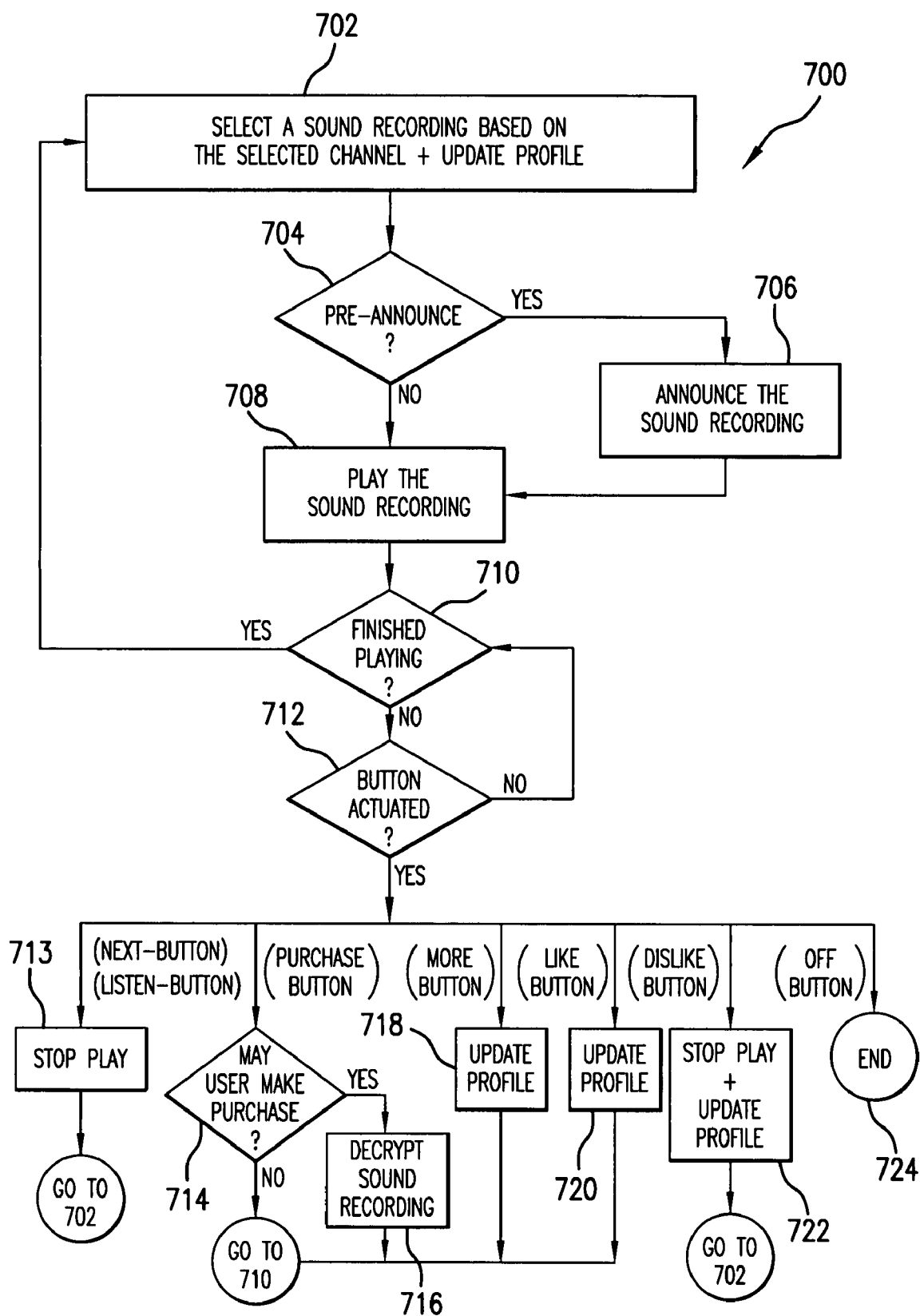
FIG. 7 is a flow chart illustrating a process, according to one embodiment, performed by a device in response to a user selecting to listen to a media channel.

FIG. 7 is a flow chart illustrating a process 700, according to one embodiment, that is performed by device 202 in response to user 110 selecting to listen to an active media channel. Process 700 begins in step 702, where device 202 selects a media content item based on the channel profile 219 that is linked with the selected channel and with the user and/or based on the user profile 221 linked with the user. In one embodiment, in addition to the selection of the media content item being based on the channel and/or user profile, the selection is also based on one or more provisions of a statute, regulation, or contract (e.g., the Digital Millennium Copyright Act (DMCA)). More specifically, in one embodiment, the audio system may select and play media content items for user 110 in such a manner that the use of the audio system by user 110 falls within a statutory compulsory license provision(s) of the DMCA.

In an embodiment where the selected media content item is in local media content item library 216, the selected media content item is retrieved from storage device 214, otherwise the selected media content item may be transmitted from server 280 to device 202.

In step 703, device 202 automatically adds an identifier identifying the selected media content item to a set of identifiers, which set identifies the media content items most recently played for the user 110 or by the device 202, and which set may be part of (a) the channel profile 219 linked with the selected media channel and user or device and/or (b) the user profile 221 linked with the user or device. This is done so that the system can keep track of the media content items to which the user 110 or device 202 has been most recently exposed. In some embodiments, the set may have a pre-defined maximum size (e.g., in one embodiment the set should not contain more than 20 media content item identifiers). In these embodiments, if adding an identifier to the set would cause the set to exceed the maximum size, then after or before adding an identifier to the set an identifier is removed from the set. Preferably, the identifier that is removed from the set is the identifier that has been a member of the set the longest. In some other embodiments, the set may not be limited to any particular size, but identifiers are removed from the set occasionally (e.g., periodically) so that the set size does not grow indefinitely. On the occasions when identifiers are removed from the set, it is preferred that the one removed are the ones that have been member of the set the longest or that have been a member of the set for more than a predetermined length of time.

In step 704, device 202 determines whether it can pre-announce the media content item. Pre-announce means to audibly and/or visually inform user 110 of the title and artist of the selected media content item prior to reproducing the media content item for user 110. If it can pre-announce the media content item it may be allowed to pre-announce it (step 706), otherwise control passes to step 708.

Preferably, if the selected media content item is a song or other type of music, device 202 can not pre-announce the media content item, unless so doing does not "violate" a law (statute or regulation) or contract. By violate we mean not conforming to one or more provisions of a statute or regulation or contract. Thus, for example, to ensure that device 202 does not violate the DMCA, device 202 might limit pre-announcements to only those music media content items that are owned by user 110. In one embodiment, device 202 determines which media content items are owned by user 110 by examining library catalogue 217, which, as mentioned earlier, keeps track of which songs in library 216 are owned by user 110.

In step 708, device 202 plays the selected media content item for the user 110. While the media content item is being reproduced for user 110, device 202 performs steps 710-724. In step 710, device 202 determines whether the media content item selected in step 702 is finished playing. If it is, control passes back to step 702, otherwise control passes to step 712.

In step 712, device 202 determines whether user 110 has selected one of the buttons 602-610 or has selected off-button 409 or has selected to listen to a new media channel. If no button is activated and if user 110 hasn't selected to listen to a new media channel, control passes back to step 710, otherwise control passes to step 713 (next-button activated 602 or user 110 has selected to listen to a new media channel), step 714 (purchase-button 604 activated), step 718 (more-button 606 activated), step 720 (like-button 608 activated), step 722 (dislike-button 610 activated), or step 724 (off-button 409 activated).

If user 110 selects next-button 602 or user 110 selects to listen to a different media channel (e.g., user 110 selects a new media channel from box 402 and then activates listen-button 403), device 202 stops reproducing the current media content item (step 713). Control then passes back to step 702 where another media content item is selected.

In one embodiment, user 110's use of next-button 602 may be limited. For example, in one embodiment, user 110 may only activate next-button 602 a predetermined number of times in any given predetermined time interval. If user 110's activation of next-button 602 causes this limit to be exceeded, then device 202 will not skip to the next media content item in response to the activation, as it normally would. A reason for this feature is to ensure that the set of media content items that are played for user 110 do not violate the DMCA.

If user 110 selects purchase-button 604, user 110 wants to purchase a copy of the media content item that is currently being played. In one embodiment, after user 110 selects purchase-button 604, device 202 communicates with a remote server to verify that the user is qualified to make the purchase (e.g., does the user have enough money is his or her account) (step 714). If device 202 determines that user may purchase the media content item that was playing when purchase-button 604 was activated, control passes to step 716, otherwise control passes back to step 710. In step 716, device 202 may create a decrypted copy of the media content item for user 110 to listen to whenever the user so desires. That is, device 202 may allow user 110 to listen to any one of the media content items that user 110 has purchased at anytime.

If user 110 activates more-button 606, user 110 wants to hear more media content items that are like the current media content item being played. In response to activation of more-button 606, device 202 updates appropriately the channel profile 219 and/or user profile 221 (step 718). If the profile 219,221 is stored in storage device 214, device 202 updates the profile directly. Otherwise, if the profile is stored on server 280, device 202 transmits an update profile message to server 280. In this case, the update profile message indicates that user 110 selected more-button 606 and contains a media content item identifier that identifies the current media content item being reproduced, an identifier identifying the user and/or device 202, and an identifier identifying the media channel being played. In one embodiment, whenever a profile is updated, a new playlist 218 corresponding to the selected media channel and user is generated and stored in storage device 214.

If user 110 activates like-button 608, user 110 wants to add the media content item being played to his or her list of most favorite media content items (e.g., to favorite media content items table 904). In response to activation of like-button 608, device 202 updates appropriately the channel profile 219 and/or user profile 221 (step 720). If the profile is stored in storage device 214, device 202 updates the profile directly. Otherwise, if the profile is stored on server 280, device 202 transmits an update profile message to server 280. In this case, the update profile message indicates that user 110 selected like-button 608 and contains a media content item identifier that identifies the current media content item being reproduced, an identifier identifying the user and/or device 202, and an identifier identifying the media channel being played.

Advantageously, in one embodiment, user 110 can indicate the degree to which he or she likes the media content item that is playing. In one embodiment, user 110 indicates the degree to which he or she likes the media content item that is playing by the number of times user 110 activates like-button 608 while the song is playing. For example, if user 110 likes the song that is playing a great deal, user 110 might activate like-button 608 three times in quick succession. Whereas, if user 110 likes the song that is playing, but only likes it a small degree compared to other songs he or she likes, user 110 might activate like-button 608 only once while the song is playing. The appropriate profile is updated to reflect the degree to which the user likes the song that is playing. In another embodiment, user 110 indicates the degree to which he or she likes the media content item that is playing by the length of time that user 110 holds down like-button 608. For example, if user 110 likes the song that is playing a great deal, user 110 would hold down the like-button 608 for a longer period of time than if user 110 only liked the playing song a little bit.

If user 110 doesn't want to hear the current media content item ever again, he or she can select dislike-button 610. In response to activation of dislike-button 610, device 202 stops reproducing the current media content item and updates appropriately the profile of the currently playing media channel (step 722). That is, device 202, at a minimum, adds the playing media content item to the user 110's list of least favorite media content items. If the profile 219 is stored in storage device 214, device 202 updates the profile 219 directly. Otherwise, if profile 219 is stored on server 280, device 202 transmits an update profile message to server 280. In this case, the update profile message indicates that user 110 selected dislike-button 610 and contains a media content item identifier that identifies the current media content item being reproduced, an identifier identifying the user and/or device 202, and an identifier identifying the media channel being played. After step 722, control passes back to step 702 where another media content item is selected and reproduced.

In one embodiment, user 110's use of dislike-button 610 may be limited. For example, user 110 may only activate dislike-button a predetermined number of times in any given predetermined time interval. If user 110's activation of dislike button causes this limit to be exceeded, then device 202 will not skip to the next media content item in response to the activation, as it otherwise might. A reason for this feature could be to ensure that the set of media content items that are played for user 110 do not violate (i.e., conforms to) the DMCA.

When user activates off-button 409, process 700 may end (step 724).

Preferably, in performing step 702, the media content items may be selected "intelligently." For example, the media content items are selected such that the resulting set of selected media content items "matches" the channel profile 219 of the selected media channel and/or user profile 221 linked with the user. For example, if the media channel is specified as follows: 40% rock genre (30% hard rock and 10% light rock) and 60% alternative genre, then the resulting set of selected media content items should closely conform to this specification. Additionally, if the channel profile 219 and/or user profile 221 indicates that the user has recently been exposed to a certain media content item, then, when selecting a media content item, the system may take this into account so that the certain media content item is not selected until after some amount of time has elapsed since the user was last exposed to the certain media content.

Additionally, the media content items can be selected to not only match a profile linked with the media channel or user, but also to conform to any statutory, regulatory or contractual requirement that governs the broadcasting of media content items. For example, if there is a requirement that all songs not owned by the listener are not allowed to be played more than once within a certain time interval (e.g., you can't play a song more than once within any given hour), then system 200 will be configured so as not to violate this requirement when it selects songs for reproduction in step 702. In short, device 202 can be programmed to ensure that device 202 does not violate any statutory, regulatory or contractual requirement, such as the DMCA.

Furthermore, in performing step 702, the set of identifiers that identifies the media content items most recently played for the user 110 or by the device 202 may be examined to ensure that the item selected in step 702 is not identified by an identifier included in the set. This feature prevents system 200 from playing an item that was recently played for the user 110 or by device 202.

As an additional feature, user 110 may have no direct control over which songs are selected in step 702. All that user 110 might directly control is a media channel's profile or the user's user profile, which merely gives user 110 indirect control over which songs are selected in step 702. That is, by having direct control over a profile, user 110 may influence which songs are selected in step 702, but can not directly control which songs will get selected. Further, user 110 has no way to determine which songs will get selected. With these features, listening to a media channel according to the present invention may be just like listening to a conventional media channel in terms of not knowing what is going to be selected next to be played.

Playlists

In some embodiments, to facilitate the selection of media content items in step 702, there exists a playlist 218 for each active channel profile 219 and/or user profile 221. As shown in FIG. 2, playlists 218 can be stored either within user device 202 or on server 280.

In most embodiments, a playlist 218 linked with a channel profile 219 and/or user profile 221 includes a list of media content item identifiers that identify media content items that have a high probability of being enjoyed by a user 110 who created the profile. The media content items identified in the playlist 218 may have a high probability of being enjoyed by the user because, at the least, a majority of the identified media content items "match" (or "fit") the profile(s). In one embodiment, all of the identified media content items match the profile(s). A playlist 218 "matches" or "fits" a profile if at least a majority of the media content items identified by the playlist match or fit the profile.

Preferably, user 110 can not directly access any playlist 218. That is, user 110 should not be allowed to view or otherwise determine the contents of any of the playlists 218. In one embodiment, this is accomplished by encrypting each playlist 218 or only storing the playlist at the server 280 and not in a user device 202. Thus, in some embodiments, software program 250 may have the key to decrypt a playlist but user 110 does not. At least one exception to this rule is that user 110 may have direct access to a playlist 218 if user 110 owns a copy of each media content item identified in the playlist 218.

Figure 8:
FIG. 8 is an illustration of a playlist, according to one embodiment.

FIG. 8 illustrates the information contained in an exemplary playlist 218. As shown in FIG. 8, playlist 218 contains a list of media content item identifies. Each media content item identifier uniquely identifies a media content item. As mentioned above, in one embodiment, each media content item identifier uniquely identifies a media content item that matches a profile with which the playlist is associated. A media content item can be any type of recording, such as a music only recording, a music video recording, or a recording of a news segment, etc. Meta-data is preferably associated with each media content item. In the case of music recordings, the meta-data may include such information as the name of the artist(s) who created the media content item, the name of an album on which the media content item is recorded, the title of the media content item, etc. Meta-data associated with a particular media content item may be displayed to user 110 in display box 850 when the particular media content item is played by device 202.

In one embodiment, a playlist generator 288 is provided to create a playlist. In other embodiments, a playlist 218 may be created by a professional audio programmer or combination of a playlist generator 288 and programmer. Playlist generator 288 may be installed in device 202 or in an external computing device, such as server 280 or PC 299, and is preferably implemented in software. As one of ordinary skill in the art will appreciate, the operation of playlist generator is same whether it is installed in server 280, PC 299 or other external computing device, and thus only the embodiments where playlist generator is stored in server 280 or device 202 are described, for the sake of brevity.

In generating a playlist 218, playlist generator 288 uses information included in the profile(s) for which the playlist is being created. Accordingly, if playlist generator 288 is installed in server 280 and not on device 202, and the profile(s) for which the playlist is being created is stored in device 202 but not on server 280, then before playlist generator 288 can generate the playlist 218, device 202 must first transmit to server 280 the profile(s). In this embodiment, after the playlist 218 is generated, server 280 may transmit the playlist 218 to device 202.

In one embodiment where a local media content item library 216 is stored in storage unit 214, a playlist 218 may be constructed so as to contain only media content item identifiers that identify a media content item that is in library 216. Thus, in this embodiment, playlist generator 288 uses the information in catalogue 217 in conjunction with a profile to create a playlist 218. Consequently, if playlist generator is installed in server 280 and not on device 202, then before playlist generator 288 can generate a playlist 218, device 202 must first transmit to server 280 library catalogue 217.

Each playlist 218 created by playlist generator 288 preferably matches the profile(s) that is/are used in creating the playlist. So, for example, if playlist generator 288 creates a playlist 218 using a profile that indicates that artist ABC is one of the user's least favorite artists, then playlist 218 might not contain any media content items from artist ABC. Similarly, for example, if the profile indicates that one of user 110's favorite songs is "Let it Be" by the Beatles, then this song may be included in the playlist 218. Also, as anyone of ordinary skill in the art can appreciate, a profile may include preferences for other characteristics, such as tempo.

Additionally, in generating a playlist based on a profile associated with a particular user 110 or device 202, playlist generator may take into account the set of identifiers that identifies media content items that have previously been played for the particular user 110 or by the particular device 202 so that the playlist does not identify items that have recently been played for the user or by the device. As an additional feature, playlist generator 288 or the programmer that creates playlist 218 may create the playlist 218 so that for each media content item identified in the playlist 218 there is provided an indication of whether or not the identified media content item may be pre-announced.

Channel Profiles 219

Each active media channel has one or more associated channel profiles 219. For example, a media channel predefined by the service provider would likely be linked with numerous channel profiles 219, one or each user or device, whereas, a user created media channel would be linked with just one channel profile 219 (i.e., the one created by the user). As discussed above, a profile 219 may be used, in one embodiment, to create a playlist 218. In certain embodiments, the channel profiles 219 may be stored in storage device 214. In other embodiments, profiles 219 may be stored on server 280.

Figure 9:
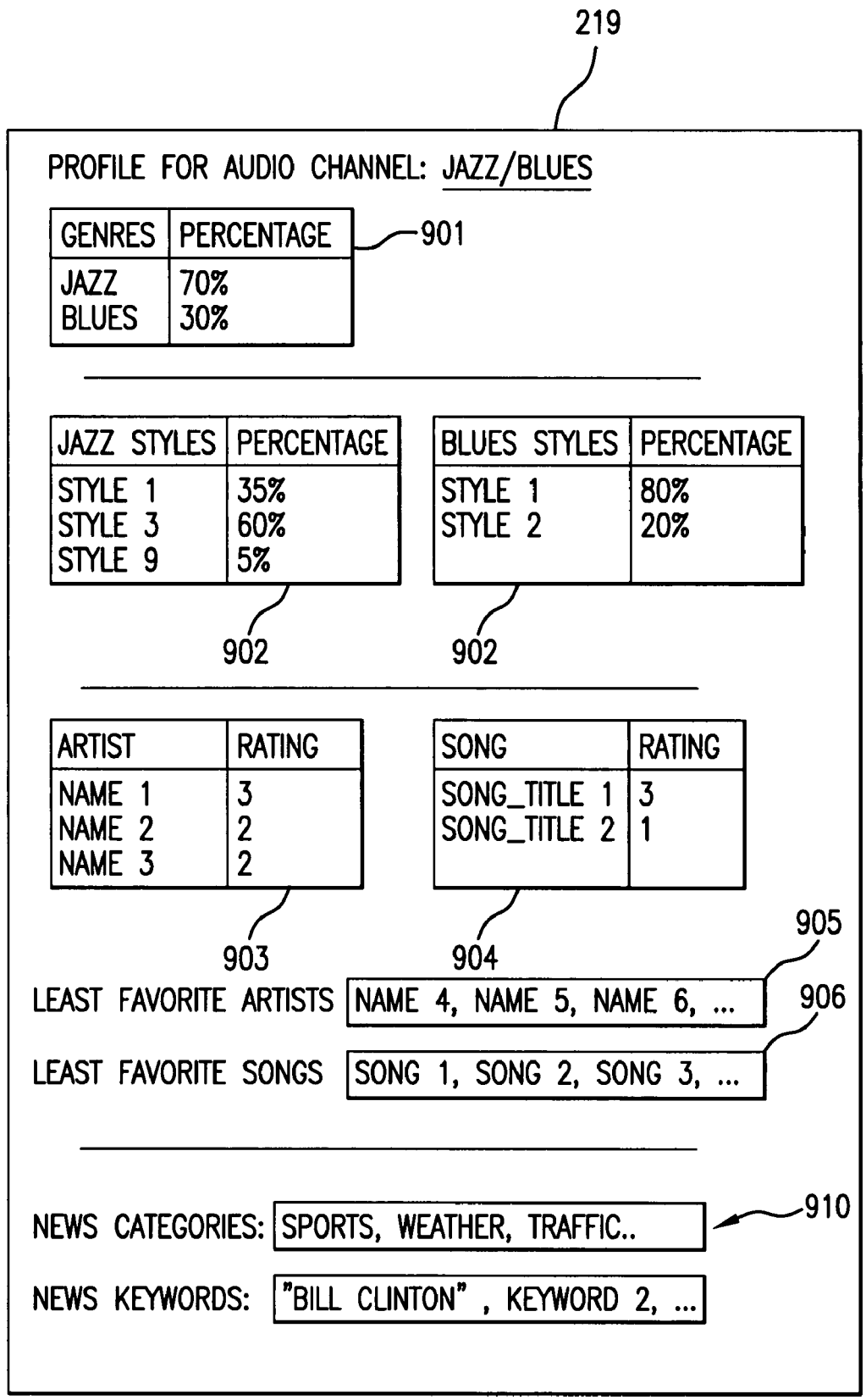
FIG. 9 is an illustration of a channel profile, according to one embodiment.

Referring to FIG. 9, an exemplary media channel profile 219 is illustrated. The profile 219 illustrated in FIG. 9 belongs to a music/information channel, as opposed to an all music channel or an all information channel. The example channel profile 219 contains channel specification information.

As shown in FIG. 9, the channel specification information, according to one embodiment, may include a table of one or more music genres ("genre-table" 901) with corresponding genre percentages, and, for each listed genre, it may include a table of styles associated with the genre ("style tables" 902) and corresponding style percentages. Profile 219 additionally may include a favorite artists table 903, a favorite media content item table 904, a least favorite artists list 905, and a least favorite media content items list 906. Favorite artists table 903 includes two columns. One column is for identifying an artist and the other column contains an integer value between and including the numbers 1 and 3. This column represents the degree to which user 110 likes the corresponding artist. A value of 1 means user 110 likes the corresponding artist only a very little, while a value of 3 means user 110 likes the corresponding artist very much. A value of 2 means user 110 likes the corresponding artist more than a just a little, but not very much.

Likewise, the favorite media content items table includes two columns, one column for identifying a media content item and one column for indicating the degree to which user 110 likes a particular media content item in the table. Because, in this embodiment, profile 219 belongs to a music/information channel, profile 219 also includes news item categories and keywords 910.

Although not shown in FIG. 9, because a particular channel profile is may be associated not only with a particular media channel, but also with a particular user or device, a channel profile 219 may include or consist only of a set of identifiers that identifies media content items that have recently been played for the particular user or device. As discussed above, this information is useful because it can be used to ensure that a device does not play a content item that it has recently played or the user has recently seen/heard.

Those skilled in the art will appreciate that the present invention is not limited to any particular design of profile 219. As is appreciated by those skilled in the art, all that is required is that profile 219 be designed to contain profile information from which a "customized" playlist can be generated. That is, profiles 219, at a minimum, contain information corresponding to, or related to, user 110's media content item preferences. In short, the profile 219 shown in FIG. 9 is used merely to illustrate an embodiment of the invention and not to limit the invention.

User Profiles 221

In one embodiment, in addition to or instead of each media channel being associated with one or more channel profiles, each user 110 of system 200 may be associated with a user profile 221. A user profile 221 may contain some or all of the same information as a channel profile 219 or different information. In embodiments that do not include channel profiles 219 but include user profiles 221 for each user or device of the system, the user profiles contain information from which a "customized" playlist can be generated. Examples of such profile information are described above in connection with FIG. 9.

Creating a New Media Channel

A feature of the present invention provides user 110 with the ability to create and modify media channels. FIG. 10 is an illustration of a possible user interface for enabling user 110 to create and modify media channels. Those skilled in the art will appreciate that the present invention is not limited to the user interface illustrated in FIG. 10 or to any particular user interface. As is appreciated by those skilled in the art, any user interface through which user 110 can specify his or her media content item preferences could be employed in the present invention. In short, FIG. 10 is used merely to illustrate an embodiment of the invention and not to limit the invention.

FIG. 10 illustrates a user interface page 1000. Page 1000 is referred to as the "create/modify profile form." User 110 accesses user interface page 1000 by selecting button 504 on page 500 (see FIG. 5). Page 1000 is a fill-in form that enables user 110 to define or modify a media channel by inputting his or her media content item preferences. The information requested by fill-in form 1000 is used to illustrate one set of user preference information. Other information in addition to or instead of the information requested by fill-in form 1000 could be collected from user 110 to define a media channel.

In filling out form 1000, user 110 may first name the channel by inputting a name into text box 1002. Next, user 110 may select one or more genres of music to be associated with the channel by selecting the appropriate genre checkboxes 1004. Next, user 110 may: (1) input the names of one or more of his or her most favorite and least favorite artists into text boxes 1006 and 1007, respectively, (2) input the names of one or more of his or her most favorite and least favorite media content items into text boxes 1008 and 1009, respectively, (3) specify news category of interest by inputting a news category into box 1010, and/or (4) specify one or more news keywords by inputting one or more keywords into box 1011. After user 110 has completed entering in the user's desired profile information user 110 selects done-button 1090. In this manner, user 110 is enabled to define customized media channels.

In one embodiment, after user 110 selects done-button 1090, the specified media channel profile information 219 is stored in storage device 214. Additionally, the newly created media channel may be placed in the active state. Optionally, device 202 may then use playlist generator 288 to create a playlist 218 that matches the profile information entered by user 110. Alternatively, if playlist generator 288 is installed on server 280 instead of in device 202, then device 202 transmits profile 219 to server 280. After receiving profile 219, server 280 uses playlist generator 288 to create a playlist 218 that matches the received profile 219, and transmits the playlist 218 to device 202 where it is then stored in storage device 214.

In another embodiment, after user 110 selects done-button 1090, the specified channel profile information 219 is transmitted to server 280, which then may store the received profile information 219. Additionally, the newly created media channel may be placed in the active state. In this embodiment, the software program 250 can be a web browser or other thin client software. After receiving the media channel profile information, server 280 may use playlist generator 288 to create a playlist 218 that matches the received profile information, and transmits the playlist 218 to device 202 where it is stored in storage device 214.

If user 110 specifies that a particular artiste (e.g, U2) is one of his or her favorite artists, a relatively large number of media content items created by U2 might be placed into the customized playlist and/or device 202/server 280 may select that artist more frequently, but, in one embodiment, in no event is the artist selected so frequently that in doing the resulting playlist would run afoul of a governing statutory, regulatory or contractual provision (e.g., the DMCA). And if a user specified one or more media content items as being favorite, then device 202 might ensure that those media content items are placed in the customized playlist and may select those media content items more frequently, but, in one embodiment, in no event are the media content items played so often that in doing so device 202 would run afoul of a governing statutory, regulatory or contractual provision. Similarly, in one embodiment, songs from the user's least favorite artists and the user's least favorite songs are not included in the playlist 218 or are included on only a limited basis. Advantageously, playlist generator 288 could be programmed to determine a set of media content items that are similar to the user's favorite media content items and to place this set of media content items into playlist 218.

In an embodiment where user interface 220 is limited (e.g., device 202 is a cable-tv set-top box as opposed to a personal computer), user 110 may use a personal computer (PC) 299 or other like device to create the media channels instead of directly using device 202. In this embodiment, software program 250 is installed on PC 299. In this embodiment, after user 110 enters the media channel specification information into pages 1000, 1400, and 1700, the entered information is sent to server 280 or to device 202, which then may store the received profile information. Server 280 or device 202 then creates playlist 218 in the manner described above and, in one embodiment, server 280 then transmits playlist 218 to device 202. In this embodiment, the software program 250 can be a web browser or other thin client software and server 280 can implement a web server.

Additional methods for creating and/or modifying a playlist 218 are described in U.S. Pat. No. 5,616,876 to Cluts and U.S. Pat. No. 5,819,160 to Foladare et al., both of which are incorporated herein by this reference.

FIGS. 11-15 illustrate various other processes 1100, 1200, 1300, 1400, and 1500, respectively, that are performed by device 202 in response to user 110 selecting to listen to a particular media channel.

Figure 11:
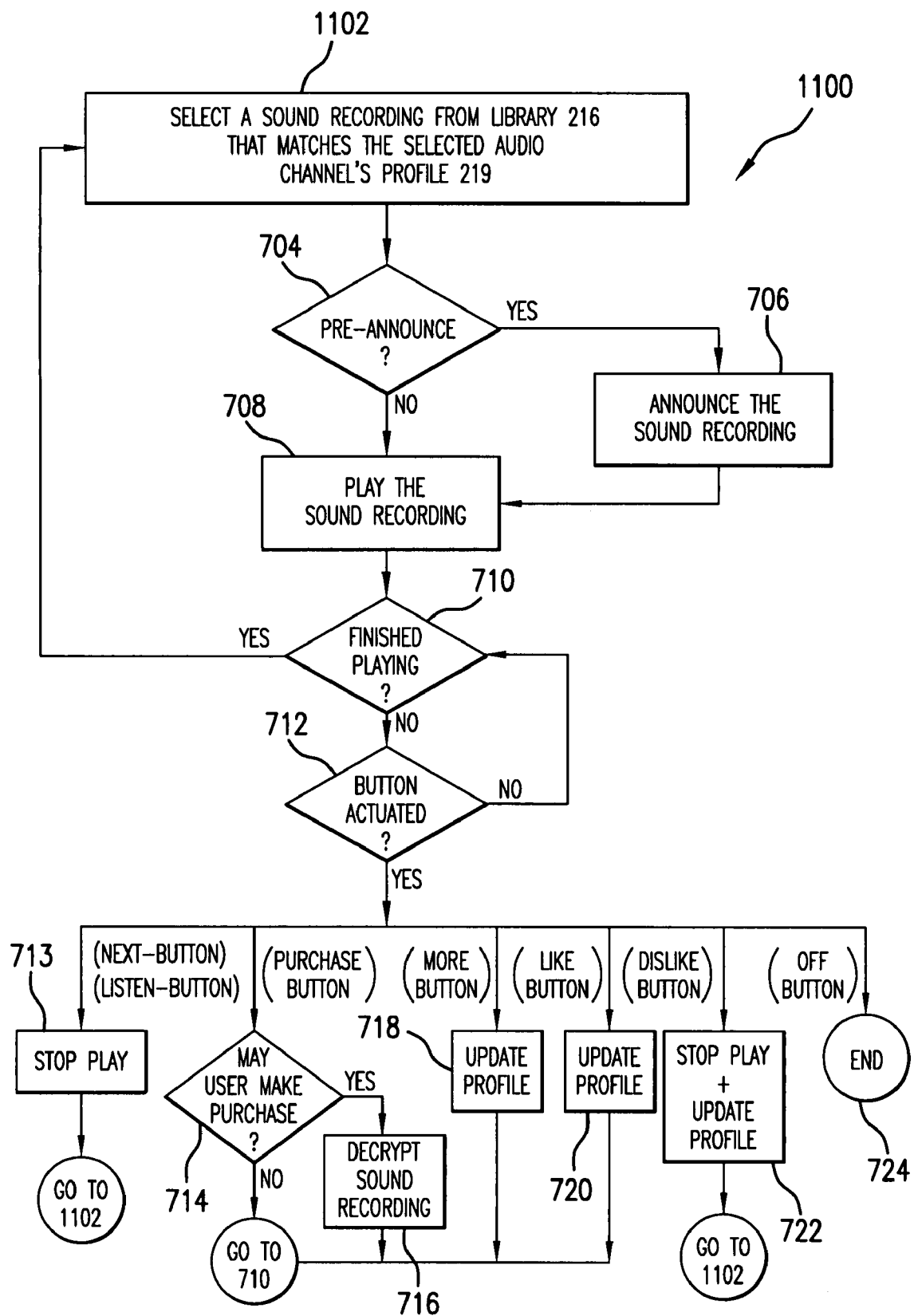
FIGS. 11-18 illustrate processes according to various embodiments.

Referring to FIG. 11, process 1100 is preferably used in the embodiment where a profile (e.g., channel profile 219 associated with the particular media channel and user 110 and/or user profile 221 associated with the user) and a local media content item library 216 is stored in storage device 214.

Process 1100 is identical to process 700, with the exception of step 1102. In step 1102, device 202 selects a media content item from library 216 that fits the channel profile 219 and/or user profile 221. In one embodiment, library catalogue 217 is examined to select a media content item from library 216 that fits the channel and/or user profile. As illustrated in FIG. 3, in one embodiment, for each media content item in library 216, library catalogue maintains a record of the genre(s) and style(s) to which the media content item belongs. This genre and/or style information is used to by device 202 in determining whether a particular media content item in library 216 matches the channel and/or user profile. Preferably, in performing step 1102, the media content items are selected "intelligently." For example, the media content items are selected such that the resulting set of selected media content items does not violate any statutory, regulatory or contractual requirement. Also, in the case where the channel and/or user profile includes a set of identifiers that identifies one or more previously played media content items (e.g., content items that were played for the user the last time the user selected to play the selected media channel or any media channel), in step 1102 device 202 will not select a content item from library 216 if an identifier identifying the content item is included in the set of content item identifiers. In this way, it is less likely device 202 will play for user 110 a content item that has recently been played for user 110.

Figure 12:
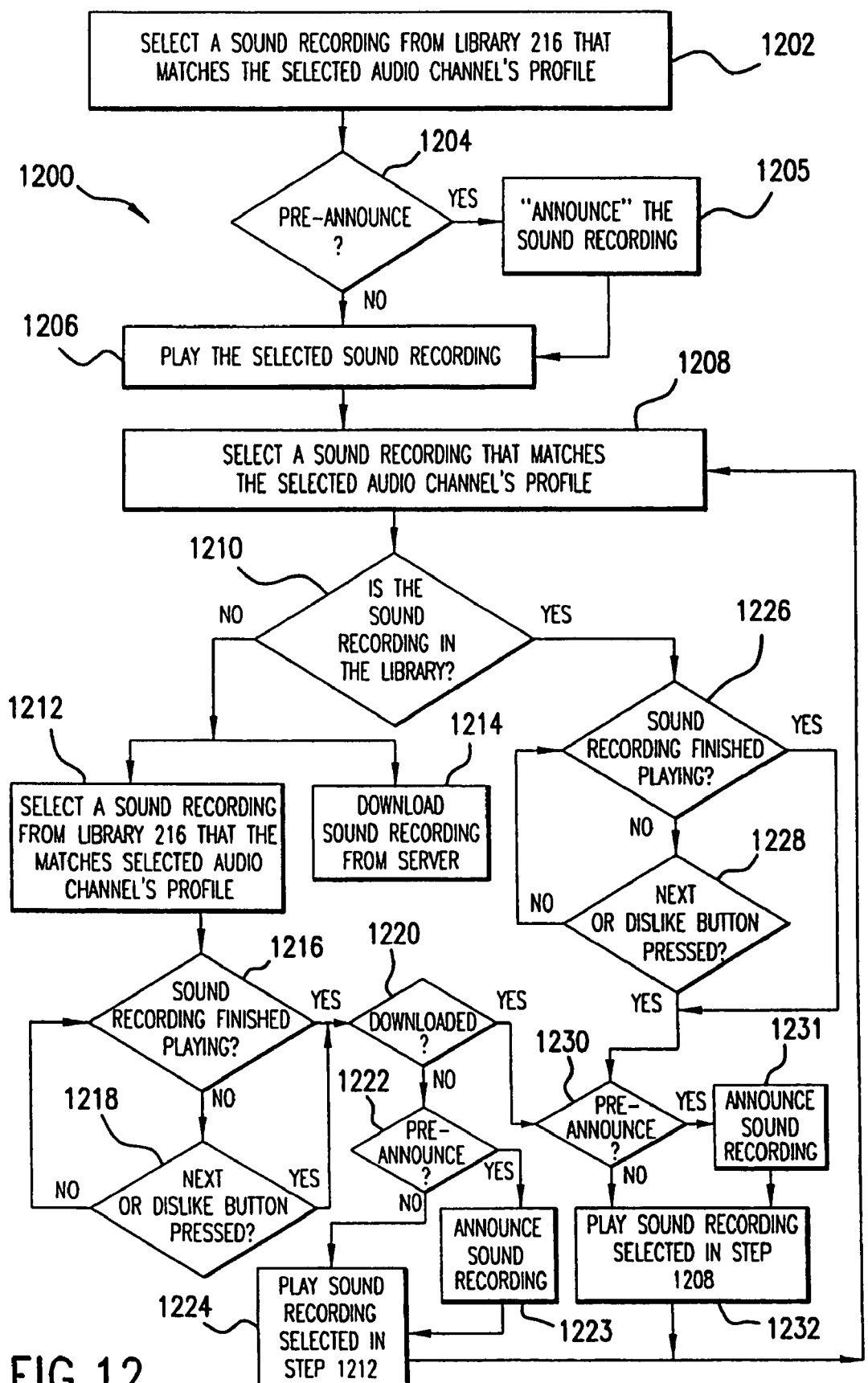

Referring to FIG. 12, process 1200 is preferably used in the embodiment where a profile (e.g., channel profile 219 associated with the particular media channel and user 110 and/or user profile 221 associated with the user) is stored in storage device 214.

Process 1200 begins in step 1202 where device 202 selects a media content item from library 216 that matches the channel and/or user profile. After step 1202 control passes to step 1204, where device 202 determines whether it may pre-announce the selected media content item. If it may, control passes to step 1205, otherwise control passes to step 1206. In step 1205 the selected media content item is audibly and/or visually announced to user 110. After step 1205, control passes to step 1206. In step 1206, device 202 begins playing the selected media content item.

While the selected media content item is being played for the user 110, device 202 selects another media content item that matches the selected channel and/or user profile (step 1208). Next, a determination is made as to whether the media content item selected in step 1208 is part of the media content item library 216 (step 1210). If the selected media content item is part of the media content item library 216, control passes to step 1226, otherwise control passes to steps 1212 and 1214.

In step 1226 a determination is made as to whether the media content item currently being reproduced is finished. If it is finished, device 202 determines whether it may pre-announce the media content item selected in step 1208 (step 1230). If it may, control passes to step 1231, otherwise control passes to step 1232. In step 1231 the media content item selected in step 1208 is audibly and/or visually announced to user 110. After step 1231, control passes to step 1232. In step 1232, device 202 begins playing the media content item selected in step 1208.

If the current media content item is not finished, device 202 determines whether next-button 602 or dislike-button 610 were selected by user 110 (step 1228). If either of those buttons were selected, then control passes to step 1226.

In step 1214, device 202 automatically downloads the media content item selected in step 1208 from server 280, stores the recording onto storage device 214, and adds the recording to local media content item library 216. Preferably, the downloaded recording is encrypted (either by the server before it transmits the recording to device 202 or by device 202 after it receives the recording). In this way, because the media content item is encrypted, only authorized people or systems can directly access the recording. Preferably, user 110 is not authorized to directly access the media content item. That is, device 202 does not give user 110 the capability to play the media content item whenever user 110 so desires. It is also preferred that the media content item be compressed before it is transmitted to save time in downloading the media content item.

In step 1212, device 202 selects a media content item from library 216 that matches the channel and/or user profile. Preferably, the media content item selected in step 1212 is very similar in genre and style to the media content item selected in step 1208. Next, device 202 determines whether the media content item currently being played is finished (step 1216). If it is finished, control passes to step 1220, otherwise control passes to step 1218.

In step 1218, device 202 determines whether next-button 602 or dislike-button 610 were selected by user 110. If either of those buttons were selected, then control proceeds to step 1220, otherwise the process returns to step 1216.

In step 1220, device 202 determines whether the media content item that is being downloaded in step 1214 is ready to be played. That is, it determines, among other things, whether a sufficient amount of the media content item has been successfully downloaded and stored onto storage device 214. If the media content item is ready to be played, then control passes to step 1230, otherwise control passes to step 1222. In step 1222, device 202 determines whether it may pre-announce the media content item selected in step 1212. If it may, control passes to step 1223, otherwise control passes to step 1224. In step 1223 the media content item selected in step 1212 is audibly and/or visually announced to user 110. After step 1223, control passes to step 1224. In step 1224, device 202 begins playing the media content item selected in step 1212. After step 1224, control passes back to step 1208.

In one embodiment, after device 202 performs step 1214, device 202 determines the next N media content items that are to be played and that are not stored in library 216 and downloads those N media content items (this could be done sequentially or all at one time or other ways). N can be any integer greater than or equal to 1. In this way, when a media content item is selected to be played in step 1208, it is likely that the media content item will be in library 216.

Although not shown as part of process 1200, when either next-button 602 or dislike-button 610 are selected, device 202 ceases playing the currently playing media content item. Additionally, if dislike-button 610 is selected, the profile of the currently selected media channel is appropriately updated. Also, although it is not shown in process 1200, device 202 processes the more-button 606, purchase-button 604, like-button 608, and off-button 409 activation event in the same manner as was described with reference to process 700.

Figure 13:
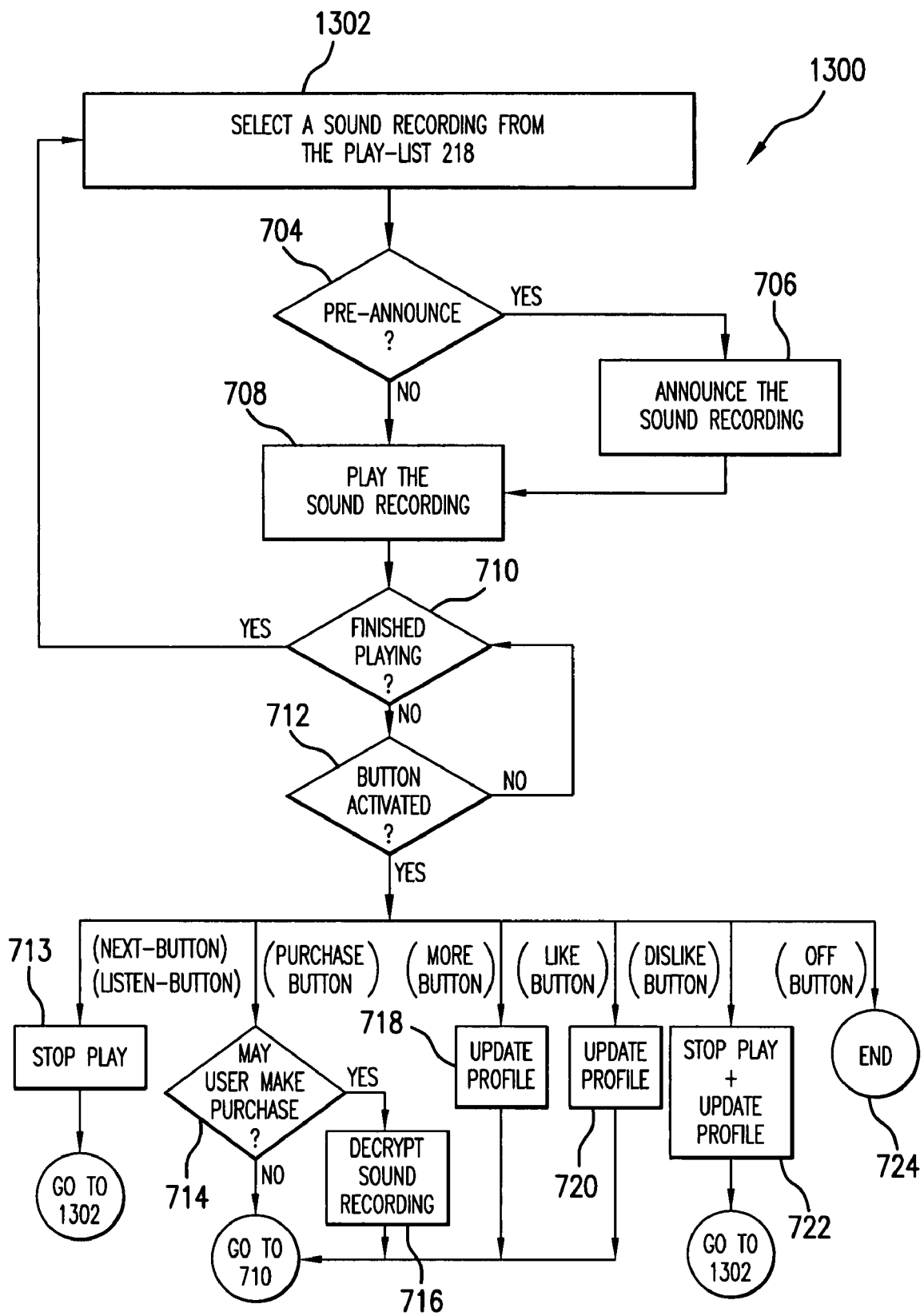

Referring to FIG. 13, process 1300 is preferably used in the embodiment where a local media content item library 216 and a playlist 219 associated with the selected media channel are stored in storage device 214, and the playlist 218 only lists media content item identifiers that identify a media content item stored in library 216. Process 1300 is identical to process 700, with the exception of step 1902. In step 1902, device 202 selects a media content item that is listed in the playlist 218.

Preferably, in this embodiment, playlist 218 contains an ordered list of media content items having a beginning and end, and, in selecting a media content item from the playlist 218, device 202 simply begins at the beginning of the playlist and selects the recordings in the order in which they are listed. Consequently, device 202 keeps track of the last media content item that it selected so it knows the next media content item to select. In one embodiment, when the last media content item that device 202 selected is at or near the end of the playlist, device 202 will use playlist generator 288 to generate a new playlist 218. In another embodiment, a new playlist 218 is generated on a periodic basis (i.e., daily, weekly, . . . ). In still another embodiment, a new playlist 218 is generated for a given active media channel whenever a profile linked with the media channel is updated.

Preferably, playlist generator 288 uses the existing playlist 218, the channel profile 219, the user profile 221, and/or library catalogue 217 to create a new playlist 218. Alternatively, if playlist generator 288 is installed in server 280 as opposed to in device 202, then device 202 may transmit to server 280 the existing playlist 218, the channel profile 219, the user profile 221, and/or library catalogue 217 (if these items are not already stored on server 280). Playlist generator 288 installed on server 280 will then have the information necessary to create the new playlist. After the new playlist is created, it may be transmitted from server 280 to device 202, where it is then stored in storage unit 214 and associated with the appropriate media channel.

Regardless of where playlist generator 288 is installed, playlist generator 288 preferably creates only playlists that (1) conform to the DMCA or similar statute, regulation or contract and (2) matches the profile 219 of the media channel with which the playlist 218 is associated.

Figure 14:
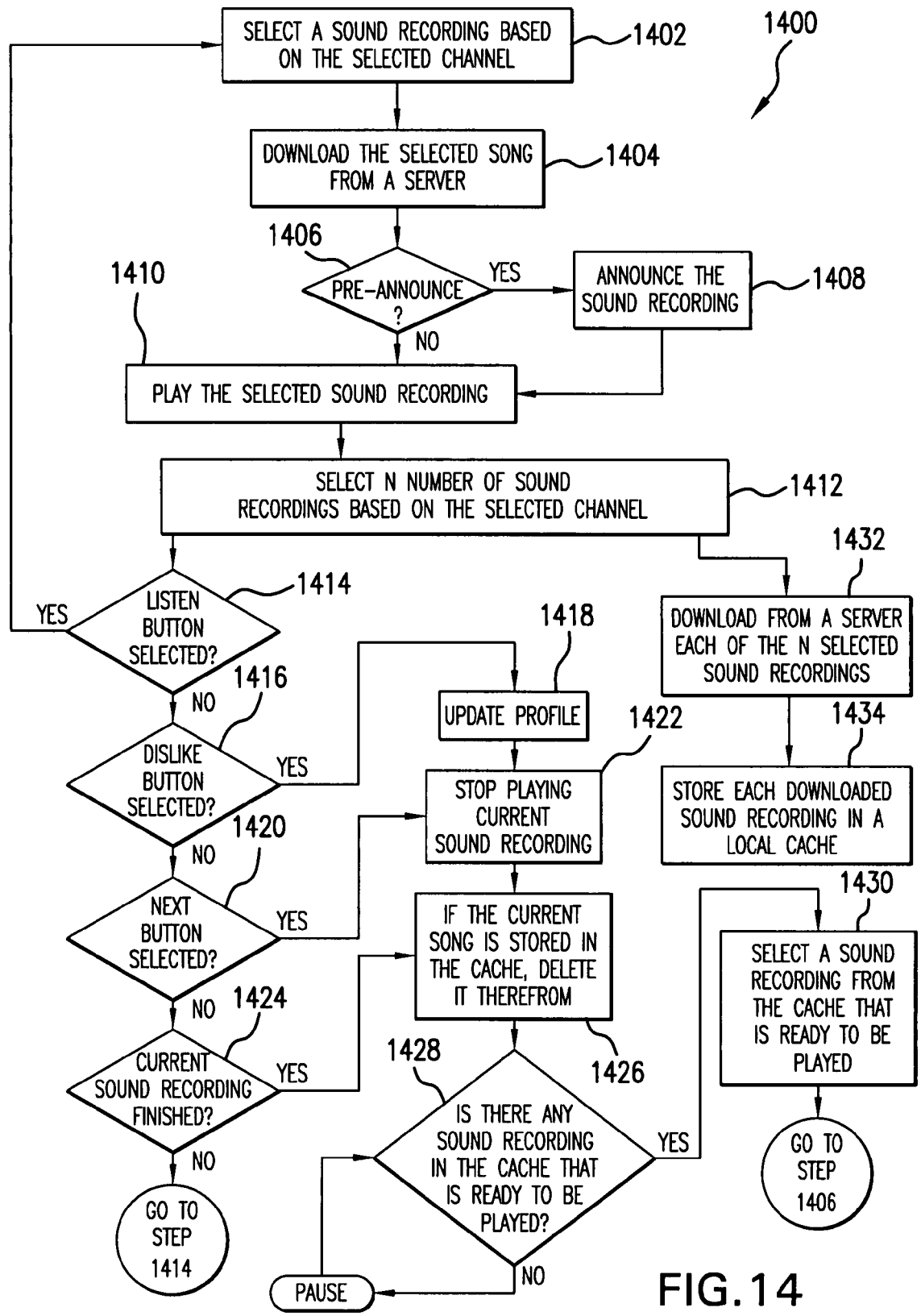

Referring to FIG. 14, process 1400 may be used in embodiments where device 202 does not maintain a local media content item library 216. Process 1400 begins in step 1402, where device 202 selects a media content item based on the media channel selected by user 110. The step of selecting a media content item may be accomplished by (A) choosing, from a given set of media content items, a media content item based on information in the channel profile 219 associated with the selected media channel and user 110 and/or information in the user profile 221 associated with the user 110, or (B) selecting a media content item that is identified by a media content item identifier that is listed in a playlist 218 that is associated with the selected media channel and user. After step 1402, device 202 downloads the selected item from a remote server (e.g., server 280) (step 1404). After step 1404, control passes to step 1406.

In step 1406, device 202 determines whether it can pre-announce the most recently selected media content item. If it can pre-announce the media content item it will (step 1408), otherwise control passes to step 1410.

In step 1410, device 202 plays the most recently selected media content item for user 110. Device 202 also selects N number of media content items based on the channel profile 219 or user profile 221 (step 1412), where N is an integer greater than or equal to 1. Preferably, N is determined by the amount of free space available in a local cache 269, which can be implemented using memory available within in data processing unit 212 (such as RAM) or which can be implemented using storage space available in storage device 214, as is illustrated in FIG. 2. While the media content item is being reproduced for user 110, device 202 performs steps 1414-1430 in parallel with steps 1432-1434.

In step 1432, device 202 downloads the selected N media content items from a remote server (e.g., server 280). In step 1434, device 202 stores each downloaded media content item in local cache 269.

In steps 1414-1424, device 202 determines whether listen-button 403 has been selected, whether dislike-button 610 has been selected, whether next-button 602 has been selected, and whether the last media content item selected to be played (i.e., the "current" media content item) is finished playing, respectively. If listen button 403 was selected, control passes back to step 1402 and, preferably, the local cache is cleared (i.e., all media content items stored in the cache are deleted). If dislike-button 610 was selected, control passes to step 1418, where device 202 updates appropriately the channel profile associated with the selected media channel and user, stops playing the current media content item, and may delete the current media content item from the cache 269 if it is stored in the cache 269 (steps 1418, 1422, and 1426, respectively). If next-button 602 was selected, control passes to step 1422, and if the current media content item is finished playing, control passes to step 1426. After step 1426, control passes to step 1428.

In step 1428, device 202 determines whether there are any media content items in the local cache 269 that are ready to be played. If not, device pauses and then returns to step 1428, otherwise control passes to step 1430. In step 1430, device 202 selects a media content item from local cache 269 that is ready to be played and control then passes back to step 1406.

Figure 15:
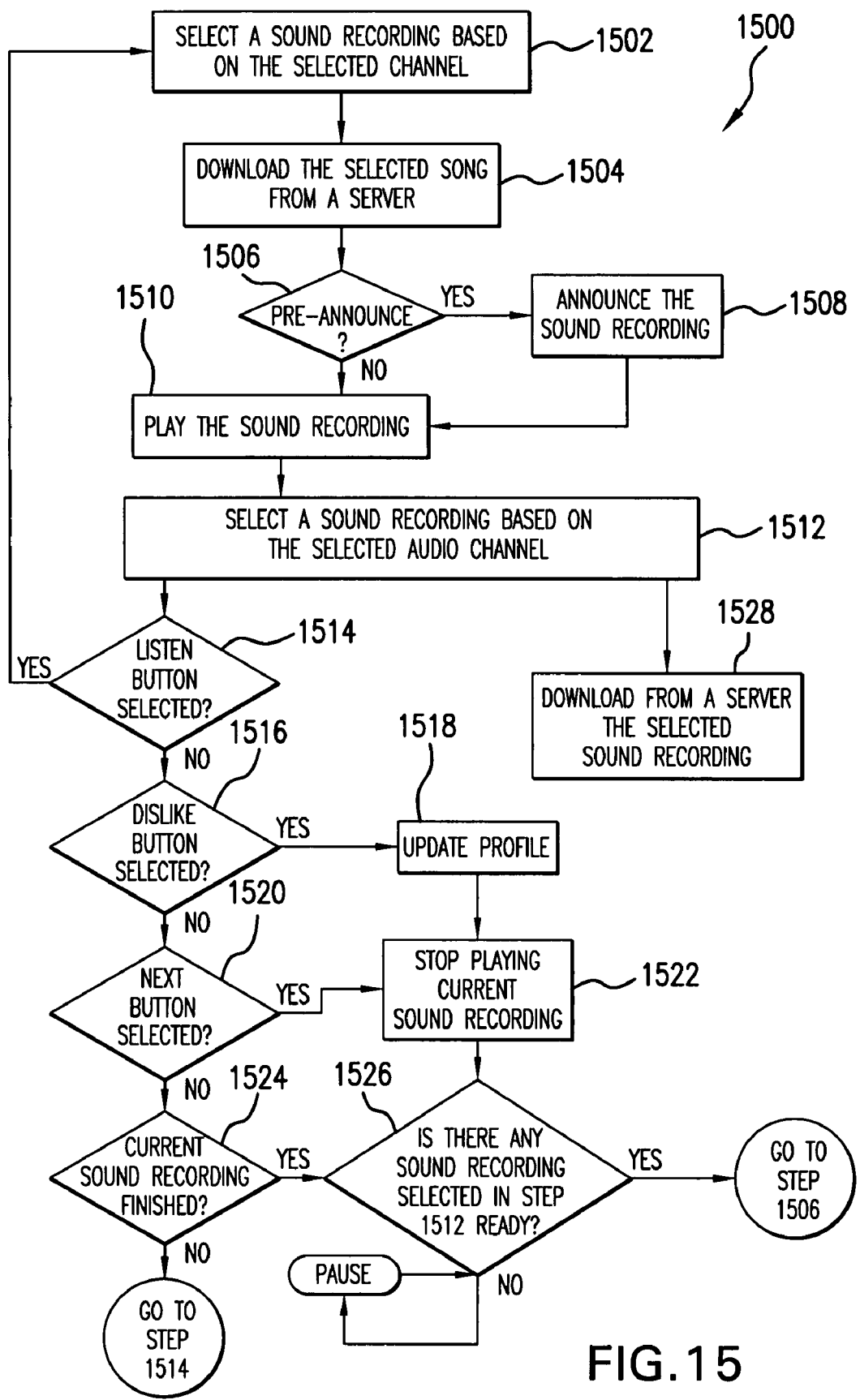

Referring to FIG. 15, process 1500 may be used in embodiments where device 202 does not maintain a local media content item library 216. Process 1500 begins in step 1502, where device 202 selects a media content item based on the channel selected by user 110. The step of selecting a media content item may be accomplished by (A) choosing, from a given set of media content items, a media content item based on information in the channel profile 219 associated with the selected media channel and user 110 and/or information in the user profile 221 associated with the user 110, or (B) selecting a media content item that is identified by a media content item identifier that is listed in a playlist 218 that is associated with the selected media channel and user. After step 1502, device 202 downloads the selected song from a remote server (e.g., server 280) (step 1504). After step 1504, control passes to step 1506.

In step 1506, device 202 determines whether it can pre-announce the most recently selected media content item. If it can pre-announce the media content item it will (step 1508), otherwise control passes to step 1510.

In step 1510, device 202 plays the most recently selected media content item for user 110. Device 202 also selects another media content item based on the channel profile 219 or user profile 221 (step 1512).

While the media content item is being reproduced for user 110, device 202 performs steps 1514-1526 in parallel with step 1528. In step 1528, device 202 downloads the most recently selected media content item (i.e., the media content item selected in step 1512) from a remote server.

In steps 1514-1524, device 202 determines whether listen-button 403 has been selected, whether dislike-button 610 has been selected, whether next-button 602 has been selected, and whether the last media content item selected to be played (i.e., the "current" media content item) is finished playing, respectively. If listen-button 403 was selected, control passes back to step 1502 and. If dislike-button 610 was selected, control passes to step 1518, where device 202 updates appropriately the channel profile associated with the selected media channel and user, and stops playing the current media content item (steps 1518 and 1522). If next-button 602 was selected, control passes to step 1522, and if the current media content item is finished playing, control passes to step 1526.

In step 1526, device 202 determines whether the most recently selected media content item is ready to be played. If it is not ready, device pauses and then returns to step 1526, otherwise control then passes back to step 1506.

Although it is not shown in either process 1400 or process 1500, device 202 processes the more-button 606, purchase-button 604, like-button 608, and off-button 409 activation event in the same manner as was described with reference to process 700.

In some embodiments, in performing process 1400 and 1500, the media content items that are selected to be played are selected based on a channel profile and/or a user profile 221. Also, as discussed above, in some embodiments, the resulting set of media content items that are played matches a profile associated with the selected media channel and user and, do not violate a statutory, regulatory, or contractual provision.

Figure 16:
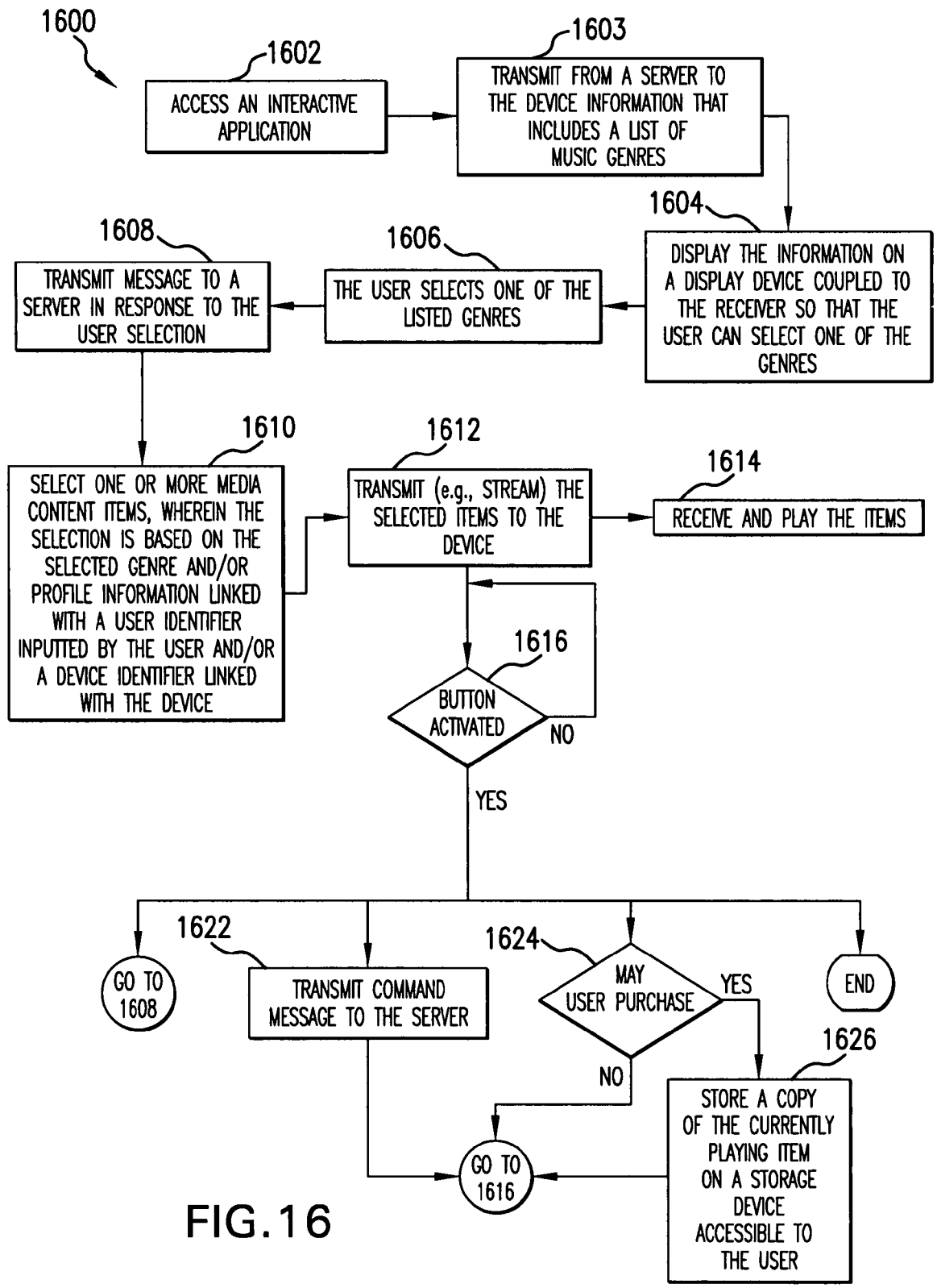

Referring to FIG. 16, FIG. 16 illustrates a process 1600 according to another embodiment of the invention. Process 1600 may begin in step 1602, where a user 110 of device 202 uses device 202 in order to access an interactive application (e.g., a portal, such as a VOD portal, a website, or other interactive service). For example, if device 202 is a set-top-box, user 110 may tune receiver 210 to a particular channel (e.g., a video-on-demand (VOD) channel) in order to access a VOD portal. In step 1603, information is transmitted from a server to device 202. The information includes a list of music genres. In step 1604, a GUI including the list of music genres is displayed by the display device. Next, user 110 selects to listen to one of the listed music genres (step 1606). In response, device 202 may transmit a message to a server (e.g., server 280) (step 1608). The message may include a genre identifier identifying the genre selected by the user, a user identifier, and/or a device identifier identifying device 202. In response to the message, the server may select a media content item based on the identified genre and/or based on profile information linked with the user identifier and/or device identifier (step 1610). As discussed herein, profile information may include media content preference information and/or a set of identifiers that identifies media content items that were previously played for user 110 or by device 202.

Next, the server transmits (e.g., streams) the selected media content item to device 202 (step 1612) and only to device 202 (i.e., the media content item is not broadcast or multicast, but rather unicast—transmitted using a one-to-one "connection"). Steps 1610 and 1612 are repeated. Meanwhile, device 202 receives the items transmitted from the server and reproduces the items for the user 110 to enjoy (step 1614) and waits for user 110 to activate a button (e.g., 403, 409, 602, 604, 606, 608, or 610) (step 1616).

If listen-button 403 is activated, control goes back to step 1608. If off-button 409 is activated, process 1600 may end. If next-button 602, more-button 606, like-button 608, or dislike-button 610 are activated, device 202 sends a command message to server 280 (step 1622) and control goes back to step 1616. Server 280 may process the command message in a similar manner as these buttons are processed by device 202 as described in process 700. For example, if next-button 602 is activated, server 280 may stop transmitting the current media content item and perform steps 1610 and 1612. The command message contains an identifier that identifies which of the buttons was activated. If purchase-button 604 is activated, device 202 or a server 280 determines whether user 110 may purchase the currently playing media content item (step 1624). If not, control goes back to step 1616, otherwise a copy of the currently playing media content item is stored on a storage device accessible to user 110 (step 1626) and the control then goes back to step 1616.

Figure 17:
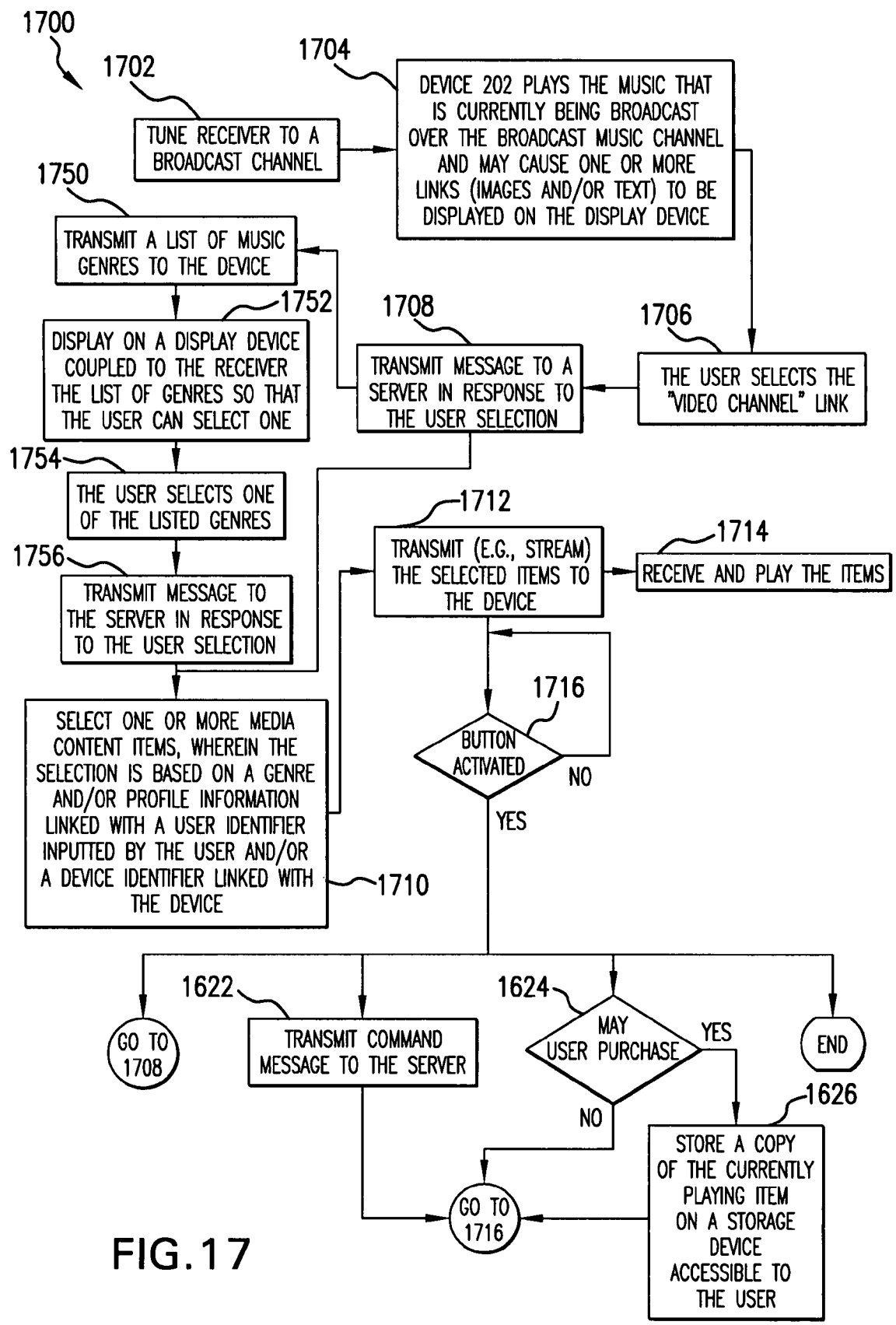

Referring to FIG. 17, FIG. 17 illustrates a process 1700 according to another embodiment of the invention. Process 1700 may begin in step 1702 where a user 110 of device 202 tunes receiver 210 to a particular broadcast channel (e.g., channel 402) over which music of predominantly a single genre is broadcast (e.g., a broadcast '80's music channel). That is, the channel is associated with a particular genre. After receiver 210 is tuned to the broadcast music channel, device 202 plays the music that is currently being broadcast over the broadcast music channel and may cause one or more links (images and/or text) to be displayed on the display device (step 1704). In some embodiments, device 202 causes to be displayed on the display device a "Video Channel" link or the like and enables the user to select the link by manipulating controls on a remote control that is in communication with device 202.

In step 1706, the user selects the "Video Channel" link. In response to the user selecting the link, device 202 may transmit a message to a server (e.g., server 280) (step 1708). The message may include an identifier identifying the broadcast music channel to which receiver 210 was tuned when the user selected the link, an identifier identifying a genre (e.g., the genre associated with the broadcast music channel to which receiver 210 was tuned when the user selected the link), a user identifier, and/or a device identifier identifying device 202.

In response to the message, the server determines whether to perform step 1710 or to step 1750. Step 1710 may be performed where the genre associated with the broadcast channel is also associated with a set of videos, whereas step 1750 may be performed where the genre is not associated with a set of videos. As an example, the Rock genre may be associated with a set of Rock music videos, whereas the Classical genre is not associated with any videos.

In step 1750, the server transmits a list of music genres to device 202. In step 1752, the list of music genres is displayed by the display device. Next, user 110 selects to listen to one of the listed music genres (step 1754). In response, device 202 may transmit a message to the server (step 1756). The message may include a genre identifier identifying the genre selected by the user, a user identifier, and/or a device identifier identifying device 202. After step 1756 the process may proceed to step 1710.

In step 1710, the server may select a media content item based on the identified channel or genre and/or based on profile information linked with the user identifier and/or device identifier (step 1710). After step 1710, the process may proceed to step 1712. In step 1712, the server transmits (e.g., streams) the selected media content item to device 202. Steps 1710 and 1712 are repeated. Meanwhile, device 202 receives the items transmitted from the server and reproduces the items for the user 110 to enjoy (step 1714) and waits for user 110 to activate a button (e.g., 602, 604, 606, 608, or 610) (step 1716).

Figure 18:
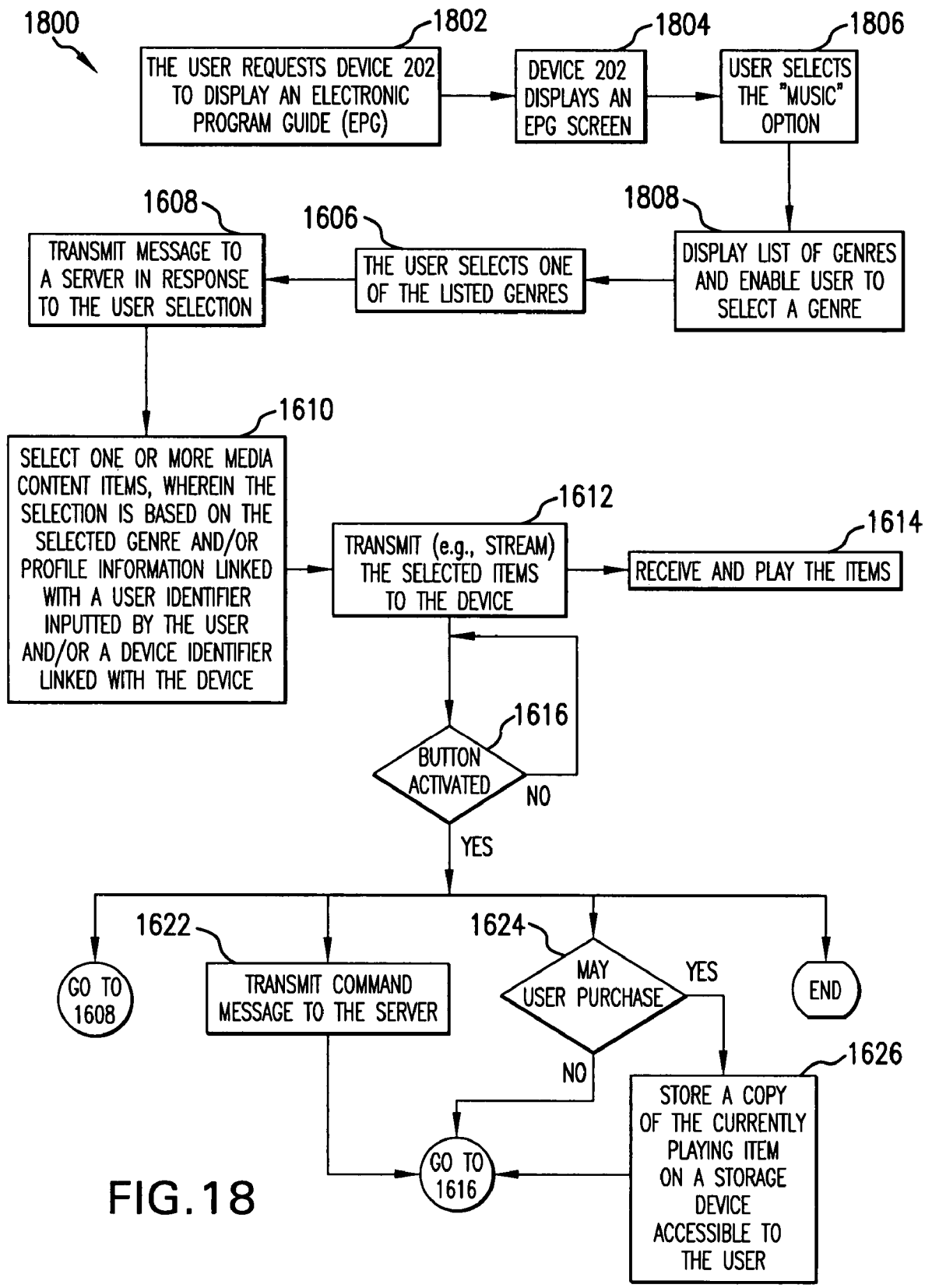

Referring to FIG. 18, FIG. 18 illustrates a process 1800 according to another embodiment of the invention. Process 1800 may begin in step 1802 where a user 110 requests device 202 to display an electronic program guide (EPG), which may be an interactive application. For example, as is well known in the art, a remote control device for sending commands to device 202 may have a "guide" button and the user 110 requests device 202 to display an EPG by activating the "guide" button. In response to activating the "guide" button, the remote control sends a signal to device 202 that causes device 202 to retrieve and display the electronic program guide. As used herein, an electronic program guide is (a) an on-screen guide to scheduled broadcast television content and/or on-demand content, allowing a viewer to navigate, select, and discover content by, among other things, time, title, channel, and/or genre by use of a remote control or other input device and/or (b) an application to list current and scheduled broadcast programs that are or will be available on each channel and on-demand channels.

Figure 19:
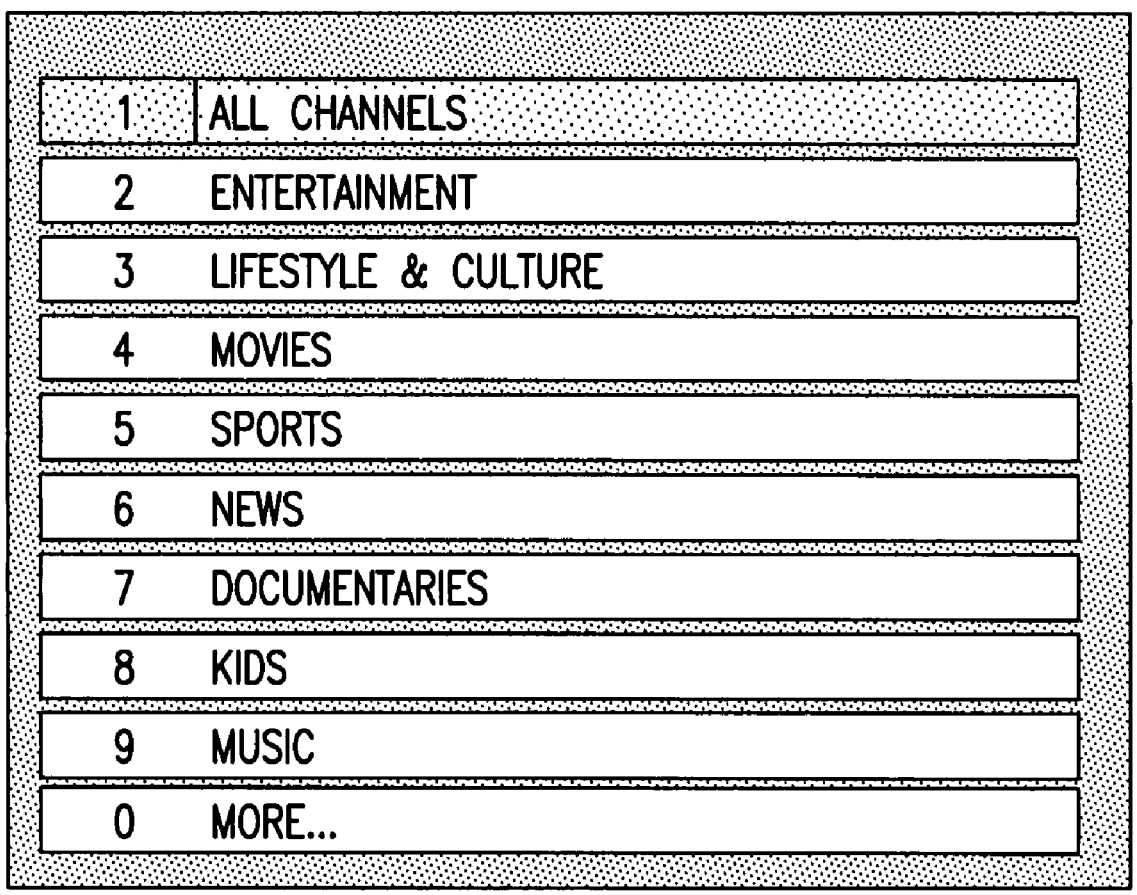
FIG. 19 illustrates a menu generated by an electronic program guide.

In step 1804, device 202 displays an EPG screen. FIG. 19 illustrates an example EPG screen 1900 that may be displayed in step 1804. As illustrated in FIG. 19, EPG 1900 enables a user to select particular content by displaying a menu of options (e.g., as illustrated, the options may include movies, sports, news, and music). Assuming EPG screen 1900 is displayed in step 1804, process 1800 may proceed to step 1806, where user 110 selects the displayed "music" option from the menu. Next, a list of music genres is displayed and the user may select one of the genres (step 1608). For example, in step 1608, device 202 may display user interface 400 or a similar user interface. Next, steps 1606-1626, which are described above, may be performed.

While various embodiments/variations of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

Additionally, while the processes described above and illustrated in the drawings are shown as a sequence of steps, this was done solely for the sake of illustration. Accordingly, it is contemplated that some steps may be added, some steps may be omitted, and the order of the steps may be re-arranged.

What is claimed is:

1. In a system comprising a server and a client device, a method for providing a customized media channel to a user of the client device, comprising:
   (a) transmitting to the client device information identifying a list of music genres, wherein the client device is operable to (i) display a graphical user interface that comprises the list of music genres and (ii) enable the user to select one of the listed music genres, wherein the client device is further operable to transmit a message to the server in response to the user selecting one of the listed music genres, wherein the message includes a genre identifier identifying the selected genre;
   (b) receiving the message transmitted by the client device;
   (c) in response to receiving the message, selecting a media content item based, at least in part, on (i) the genre selected by the user and (ii) profile information associated with a user identifier input by the user and/or a client device identifier associated with the client device; and
   (d) immediately after step (c), transmitting the selected media content item to the client device using a one-to-one connection, wherein the client device is arranged to receive the media content item and play the media content item for the user.

2. The method of claim 1, wherein the profile information comprises a set of identifiers identifying media content items previously played for the user and/or previously transmitted to the client device.

3. The method of claim 2, further comprising adding to the set of identifiers an identifier that identifies the selected media content item.

4. The method of claim 3, further comprising occasionally removing one or more identifies from the set of identifiers.

5. The method of claim 4, wherein the set of identifiers has a predefined maximum size.

6. The method of claim 1, wherein the profile information consist of a set of identifiers identifying media content items previously played for the user and/or previously transmitted to the client device.

7. The method of claim 1, wherein the profile information is associated with a client device identifier that is associated with the client device.

8. The method of claim 1, further comprising enabling a user to indicate that the user likes or does not like the media content item while the media content item is being played.

9. The method of claim 8, further comprising updating the profile information as a result of the user indicating that he or she likes or does not like the media content item.

10. The method of claim 1, wherein the step of selecting a media content item comprises retrieving a media content item identifier from a playlist.

11. The method of claim 1, further comprising:
    (e) transmitting an electronic program guide to the client device; and
    (f) receiving from the client device a message indicating the user selected a music option from the electronic program guide, wherein
    steps (e) and (f) are performed prior to step (a).

12. The method of claim 11, wherein step (a) occurs in response to receiving the message indicating the user selected the music option.

13. A communication system, comprising:
    a server system; and
    a network enabling a user client to communicate with the server system, wherein
    the server system is operable to:
    (a) transmit to the user client information comprising a list of music genres;
    (b) receive from the user client a message indicating that the user selected one of the listed genres and including an identifier identifying the selected genre;
    (c) select one or more media content items in response to receiving the message, wherein the selection of the one or more media content items is based, at least in part, on (i) the genre selected by the user and (ii) profile information associated with a user identifier input by the user and/or a client identifier associated with the client; and
    (d) transmit the selected media items to, and only to, the user client.

14. The system of claim 13, wherein the profile information comprises a set of identifiers identifying media content items previously played for the user and/or previously transmitted to the client.

15. The system of claim 14, wherein the sever system is further operable to add to the set of identifiers an identifier that identifies one of the selected media content items.

16. The system of claim 15, wherein the server is further operable to occasionally remove one or more identifies from the set of identifiers.

17. The system of claim 16, wherein the set of identifiers has a predefined maximum size.

18. The system of claim 13, wherein the profile information consist of a set of identifiers identifying media content items previously played for the user and/or previously transmitted to the client.

19. The system of claim 13, wherein the profile information is associated with a client identifier that is associated with the client.

20. The system of claim 13, wherein the user client is operable to enable a user to indicate that the user likes or does not like a media content item while the media content item is being played by the user client.

21. The system of claim 20, wherein the server system is further operable to update the profile information in response to receiving from the user client a communication that is sent from the user client to the server system in response to the user indicating that the user likes or does not like the media content item.

22. The system of claim 13, wherein the server system is configured to select the one or more media content items by retrieving media content item identifiers from a playlist.

23. The system of claim 13, wherein the user client is a set-top box.

24. The system of claim 23, further comprising a television monitor connected to the set-top box.

25. The system of claim 24, wherein the network is a cable-tv network.

26. In a system comprising a server and a client device, a method for providing a customized media channel to a user of the client device, comprising:
 (a) transmitting electronic program guide information to the client device so that the client device can display to the user an electronic program guide having a music option;
 (b) after step (a), receiving from the client device a first message indicating the user selected the music option from the electronic program guide;
 (c) in response to receiving the first message, transmitting to the client device information identifying a list of music genres, wherein the client device is operable to (i) display a graphical user interface that comprises the list of music genres and (ii) enable the user to select one of the listed music genres, wherein the client device is further operable to transmit a second message in response to the user selecting one of the listed music genres, wherein the message includes a genre identifier identifying the selected genre;
 (d) receiving the second message transmitted by the client device;
 (e) in response to receiving the second message, selecting a media content item based, at least in part, on (i) the genre selected by the user and (ii) profile information associated with a user identifier input by the user and/or a client identifier associated with the client; and
 (f) immediately after step (e), transmitting the selected media content item to the client device using a one-to-one connection, wherein the client device is arranged to receive the media content item and play the media content item for the user.

27. The method of claim 26, wherein the profile information comprises a set of identifiers identifying media content items previously played for the user and/or previously transmitted to the client device.

28. The method of claim 27, further comprising adding to the set of identifiers an identifier that identifies the selected media content item.

29. The method of claim 28, further comprising occasionally removing one or more identifies from the set of identifiers.

30. A server system coupled to a client device via a network, the server system being configured to:
 (a) transmit electronic program guide information to the client device so that the client device can display to a user of the client device an electronic program guide having a music option;
 (b) transmit to the client device information identifying a list of music genres in response to receiving, from the client device, a first message indicating the user selected the music option from the electronic program guide;
 (c) select one or more media content items in response to receiving, from the client device, a second message transmitted in response to the user selecting one of the music genres, wherein the message includes an identifier identifying the selected genre, and the selection of the one or more media content items is based, at least in part, on (i) the genre selected by the user and (ii) profile information associated with a user identifier input by the user and/or a client identifier associated with the client device; and
 (d) transmit the selected media content items to the client device.

31. The server system of claim 30, wherein the profile information comprises a set of identifiers identifying media content items previously played for the user and/or previously transmitted to the client device.

32. The server system of claim 31, wherein the sever system is further operable to, for each selected media content item, add to the set of identifiers an identifier that identifies the selected media content item.

* * * * *